United States Patent
He et al.

(10) Patent No.: US 11,270,343 B2
(45) Date of Patent: Mar. 8, 2022

(54) METHOD AND APPARATUS FOR GENERATING TARGETED LABEL, AND STORAGE MEDIUM

(71) Applicant: TENCENT TECHNOLOGY (SHENZHEN) COMPANY LIMITED, Shenzhen (CN)

(72) Inventors: Xu He, Shenzhen (CN); Xiwang Yang, Shenzhen (CN); Gong Chen, Shenzhen (CN); Chong Peng, Shenzhen (CN); Yuanfeng Song, Shenzhen (CN); Shi Huang, Shenzhen (CN); Bifeng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/219,862

(22) Filed: Dec. 13, 2018

(65) Prior Publication Data

US 2019/0122260 A1    Apr. 25, 2019

Related U.S. Application Data

(63) Continuation of application No. PCT/CN2017/099613, filed on Aug. 30, 2017.

(30) Foreign Application Priority Data

Sep. 27, 2016   (CN) .......................... 201610855555.3

(51) Int. Cl.
G06Q 30/02    (2012.01)
G06F 16/95    (2019.01)
(Continued)

(52) U.S. Cl.
CPC ..... *G06Q 30/0255* (2013.01); *G06F 16/9535* (2019.01); *G06Q 30/0269* (2013.01);
(Continued)

(58) Field of Classification Search
CPC ... G06F 3/0484; G06F 16/9535; H04L 67/306
(Continued)

(56) References Cited

U.S. PATENT DOCUMENTS 8,296,380 B1 * 10/2012 Kelly ................... G06Q 10/107
709/206
9,686,213 B2    6/2017 Xiang
(Continued)

FOREIGN PATENT DOCUMENTS

CN    103840950 A    6/2014
CN    104317959 A    1/2015
(Continued)

OTHER PUBLICATIONS

Office Action dated Nov. 21, 2019 in Chinese Patent Application No. 201610855555.3 with partial English translation.
(Continued)

*Primary Examiner* — Saba Dagnew
(74) *Attorney, Agent, or Firm* — Oblon, McClelland, Maier & Neustadt, L.L.P.

(57) ABSTRACT

A method for generating a targeted label is provided. An official account in a social network platform is determined by processing circuitry of an apparatus. A plurality of user accounts in the social network platform that follows the official account of the determined provider is determined. Each of the plurality of user accounts has a corresponding user label that indicates a user attribute of a user associated with the respective user account. The plurality of user accounts is added to a set of targeted user accounts. The targeted label for the recommendation information is deter-
(Continued)

mined according to the user labels of the plurality of user accounts. Subsequently a set of target user accounts in the social network platform is determined according to the determined targeted label, and the recommendation information is sent to user clients of the user account included in the set of target user accounts.

17 Claims, 17 Drawing Sheets

(51) Int. Cl.
*G06F 16/9535* (2019.01)
*H04L 51/52* (2022.01)
*H04L 51/00* (2022.01)
*G06Q 50/00* (2012.01)
*H04L 51/10* (2022.01)

(52) U.S. Cl.
CPC ......... *G06Q 30/0277* (2013.01); *G06Q 50/01* (2013.01); *H04L 51/14* (2013.01); *H04L 51/32* (2013.01); *H04L 51/10* (2013.01)

(58) Field of Classification Search
USPC ........................................ 707/689; 175/14.73
See application file for complete search history.

(56) References Cited

U.S. PATENT DOCUMENTS

| | | | |
|---|---|---|---|
| 2010/0250370 A1 | 9/2010 | Jones et al. | |
| 2014/0089816 A1* | 3/2014 | DiPersia | G06F 3/0484 |
| | | | 715/753 |
| 2014/0337436 A1* | 11/2014 | Hoagland | G06F 16/9535 |
| | | | 709/204 |
| 2015/0242424 A1* | 8/2015 | Godsey | G06Q 50/01 |
| | | | 707/689 |
| 2016/0308800 A1* | 10/2016 | Xiang | H04L 67/306 |
| 2017/0187665 A1* | 6/2017 | Ju | H04L 67/22 |

FOREIGN PATENT DOCUMENTS

| | | | |
|---|---|---|---|
| CN | 104394060 A | 3/2015 | |
| CN | 105023165 A | 11/2015 | |
| CN | 105447730 A | 3/2016 | |
| CN | 105468723 A | 4/2016 | |
| CN | 106357517 A | 1/2017 | |

OTHER PUBLICATIONS

"How advertisers can quickly find a quality public account", Baidu Experience, Jul. 4, 2016, with machine English translation.
International Search Report & Written Opinion dated Oct. 27, 2017 in PCT/CN2017/099613, filed Aug. 30, 2017 (w/English translation of Category of Cited Documents) 9 pp.
International Preliminary Report on Patentability dated Apr. 2, 2019 in PCT/CN2017/099613.
Office Action dated Jun. 28, 2019 in Chinese Patent Application No. 201610855555.3, with partial English translation.
Chinese Office Action dated May 7, 2020 in Chinese Application No. 201610855555.3 (with concise English Translation).
Yijun Zhou, "On the significance of the WeChat public platform's statistical function to the enterprise's WeChat marketing," Radio & TV Journal, Jan. 31, 2015, pp. 117-119 (with English Translation).

\* cited by examiner

METHOD AND APPARATUS FOR GENERATING TARGETED LABEL, AND STORAGE MEDIUM

RELATED APPLICATION

This application is a continuation of International Application No. PCT/CN2017/099613, filed on Aug. 30, 2017, which claims priority to Chinese Patent Application No. 201610855555.3, entitled "METHOD AND APPARATUS FOR GENERATING TARGETED LABEL" filed on Sep. 27, 2016. The entire disclosures of the prior applications are hereby incorporated by reference in their entirety.

FIELD OF THE TECHNOLOGY

Examples of this application relate to the field of Internet technologies.

BACKGROUND OF THE DISCLOSURE

In the process of targeted advertising, an advertiser sets several targeted labels on an advertisement platform, such as at least one of the age, gender, education, region, and interest. The advertisement platform determines a target user group corresponding to an advertisement according to the several targeted labels, for advertising to the target user group. Target quality users that are interested in the advertisement of the advertiser can be quickly positioned by advertising according to the targeted label.

SUMMARY

To resolve the problem that advertising of a new advertisement A affects advertising of an existing advertisement B, and an advertising effect of the new advertisement A is relatively poor caused by using a targeted label corresponding to the existing advertisement B as a recommended targeted label of the new advertisement A, examples of this application provide a method and an apparatus for generating a targeted label. The technical solutions are as follows:

According to a first aspect, a method for generating a targeted label is provided. In the disclosed method, an official account in a social network platform of a provider of the recommendation information is determined by processing circuitry of an apparatus. Next, a plurality of user accounts in the social network platform that follows the official account of the determined provide is determined. Each of the plurality of user accounts has a corresponding user label that indicates a user attribute of a user associated with the respective user account. The plurality of user accounts is then added to a set of targeted user accounts. The targeted label for the recommendation information is further determined according to the user labels of the plurality of user accounts included in the set of targeted user accounts. Subsequently a set of target user accounts in the social network platform is determined by the processing circuitry according to the determined targeted label, and the recommendation information is sent to user clients of the user accounts included in the set of target user accounts.

According to a second aspect, an apparatus is provided. The apparatus includes processing circuitry. The processing circuitry is configured to determine an official account in a social network platform of a provider of the recommendation information. The processing circuitry is also configured to determine a plurality of user accounts in the social network platform that follows the official account of the determined provider. Each of the plurality of user accounts has a corresponding user label that indicates a user attribute of a user associated with the respective user account. Further, the processing circuitry is configured to add the plurality of user accounts to a set of targeted user accounts, and determine the targeted label for the recommendation information according to the user labels of the plurality of user accounts included in the set of targeted user accounts. Next, the processing circuitry is configured to determine a set of target user accounts in the social network platform according to the determined targeted label, and send the recommendation information to user clients of the user accounts included in the set of target user accounts via interface circuitry.

According to a third aspect, a non-transitory computer readable storage medium is provided. The non-transitory computer-readable storage medium stores a program executable by a at least one processor to determine an official account in a social network platform of a provider of the recommendation information. A plurality of user accounts in the social network platform that follows the official account of the determined provider is determined. Each of the plurality of user accounts has a corresponding user label that indicates a user attribute of a user associated with the respective user account. The plurality of user accounts are added to a set of targeted user accounts, and the targeted label for the recommendation information are determined according to the user labels of the plurality of user accounts included in the set of targeted user accounts. Next, a set of target user accounts in the social network platform are determined according to the determined targeted label, and the recommendation information is sent to user clients of the user accounts included in the set of target user accounts via interface circuitry.

BRIEF DESCRIPTION OF THE DRAWINGS

To describe the technical solutions in the examples of this application more clearly, the following briefly introduces the accompanying drawings required for describing the examples. The accompanying drawings in the following description show only some examples of this application, and a person of ordinary skill in the art may still derive other drawings from these accompanying drawings.

DESCRIPTION OF EMBODIMENTS

Figure 1:
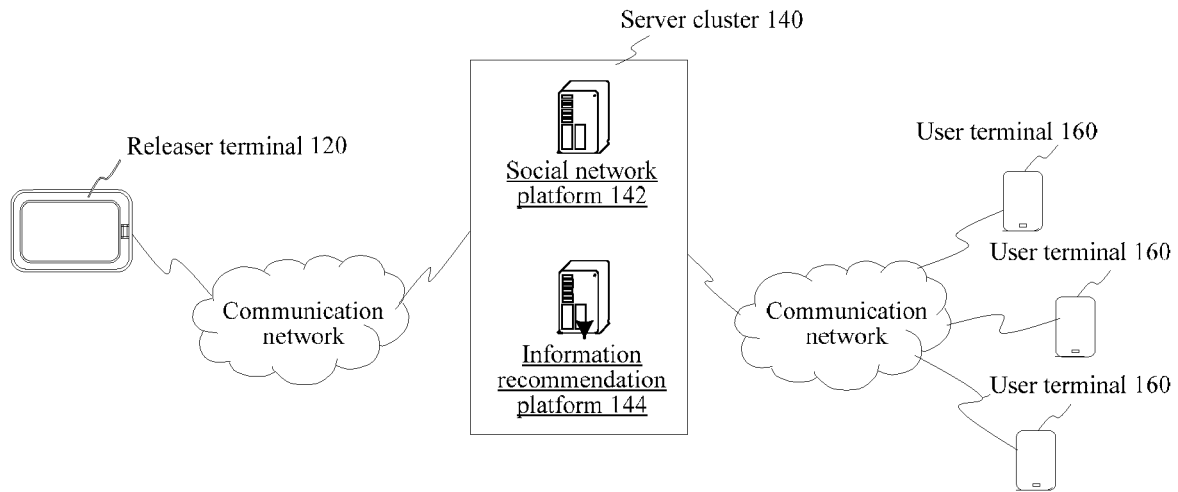
FIG. 1 is a schematic structural diagram of a system for sending recommendation information according to an example of this application.

To make the objectives, technical solutions, and advantages of this application clearer, the following further describes the implementations of this application in detail with reference to the accompanying drawings.

First, some nouns involved in examples of this application are explained.

Social network platform: a network architecture that links person to person by using a social relationship and or common interest (or common benefit). A user may perform daily communication and process some daily routines by using a client provided by the social network platform. Each user may own a user account identified by another user on the social network platform.

On the social network platform, different users may establish a social relationship in a manner of mutual confirmation, for example, adding each other as a friend or following each other. After two users establish a social relationship, they become contacts of each other. A group of users may form a mutual social relationship in a manner of voluntary selection, thereby forming a social group. Each member in the group is a contact of all other members in the group.

Official account: an account that implements information interaction with a followed user account in a social network platform and that is of a user or an organization, allowing public (such as any user on the social network platform) to communicate with the official account on the social network platform. A followed user account disclosed herein may be a user account in the social network platform that follows the official account of the releaser (or provider) that provides the recommendation information. The communication may be based on a one-way confirmation manner, such as a manner of follow or subscription, without mutual confirmation between users. For example, a user may select to follow (such as: follow) a message or released information of the official account, to become a followed user account corresponding to the official account. An owner of the official account may further use another user that follows the message or released information of the official account as a contact.

Each user identity and each official account on the social network platform both have a contact list, for communication with user accounts or official accounts in the contact list in forms such as a text message, microblog information, a voice message, and a video message.

Information recommendation platform: a platform for targeted release of recommendation information to a target user client, which is a client on which a target user account is logged. Optionally, the recommendation information is information having recommendation value such as advertisement information, multimedia information, or consultation information.

Releaser (or provider): a user or an organization that releases or provides recommendation information on an information recommendation platform. When the recommendation information is advertisement information, the releaser is an advertiser.

Followed user account: for an official account, a user account following the official account is briefly referred to as a followed user account.

Referring to FIG. 1, FIG. 1 is a schematic structural diagram of a system for sending recommendation information according to an example of this application. The system includes a releaser terminal 120, a server cluster 140, and at least one user terminal 160.

A releaser client runs in the releaser terminal 120. The releaser terminal 120 may be a mobile phone, a tablet computer, an e-book reader, a moving picture experts group audio layer III (MP3) player, a moving picture experts group audio layer IV (MP4) player, a portable laptop computer, a desktop computer, or the like. The releaser client is a software client that releases recommendation information on an information recommendation platform.

The releaser terminal 120 is connected to the server cluster 140 by using a communication network. Optionally, the communication network is a wired network or a wireless network.

The server cluster 140 is a server, several servers, a virtualization platform, or a cloud computing service center. Optionally, the server cluster 140 includes a server configured to implement a social network platform 142. Optionally, the server cluster 140 includes a server configured to implement an information recommendation platform 144.

Optionally, the social network platform 142 includes: a server configured to receive and send social information, a server configured to manage and store user accounts, a server configured to manage and store official accounts, and a server configured to manage contact lists of user accounts or official accounts. For example, the social network platform 142 is a server deployed by a department that provides WeChat communication services in Tencent of China. The social network platform 142 is connected to the information recommendation platform 144 by using a network or an optical fiber.

Optionally, the information recommendation platform 144 includes: a server configured to send recommendation information to a user terminal 160, and a server configured to determine a targeted label for the recommendation information.

The server cluster 140 is connected to the user terminal 160 by using a communication network. Optionally, the communication network is a wired network or a wireless network.

A user client runs in the user terminal 160, and a user account is logged in the user client. The user terminal 160 may also be a mobile phone, a tablet computer, an e-book reader, an MP3 player, an MP4 player, a portable laptop computer, a desktop computer, or the like. The user client may be a social network client, such as a microblog client, a WeChat client produced by Tencent in China, or a Yixin client produced by Alibaba in China. The user client may also be another client also having social attributes, such as a shopping client, a game client, a reading client, or a client dedicated in sending recommendation information.

Usually, the releaser terminal 120 sends recommendation information to the server cluster 140. The releaser terminal 120 may also specify a targeted label on the server cluster 140, which determines a target user client according to the targeted label, and then sends recommendation information to the user terminal 160 on which the target user client is located. The accuracy of the target label specified by the releaser is not high, and the coverage dimension is not comprehensive enough.

In some examples, an information recommendation platform determines a targeted label of to-be-pushed information. By using advertisement pushing as an example for description, if an advertiser hopes to advertise a new advertisement A, an advertisement platform searches for an existing advertisement B that is similar to the new advertisement A and that has a relatively good advertising effect, and uses a targeted label corresponding to the existing advertisement B as a recommended targeted label of the new advertisement A. The advertiser may adopt the recommended targeted label, and advertise the new advertisement A according to a target user group determined by the recommended targeted label. However, in this example, if the existing advertisement B is still advertised, advertising of the new advertisement A affects the advertising effect of the existing advertisement B. In addition, because the new advertisement A is relatively similar to the existing advertisement B, if they are advertised to a same target user group, the target user group generates immunity to a same type of advertisement, resulting in a relatively poor advertising effect. Consequently, computing resources and advertising resources on the advertisement platform are wasted.

To resolve the foregoing technical problem, an example of this application provides a technical solution of determining a targeted label of recommendation information by using a followed user account corresponding to an official account. For releasers of information, most of releasers register official accounts on a social network platform, and each official account has a plurality of corresponding followed user accounts. For example, a releaser A registers an official account A on the social network platform, and has a corresponding followed user account A1, followed user account A2, and followed user account A3; a releaser B registers an official account B on the social network platform, and has a corresponding followed user account B1, followed user account B2, and followed user account B3.

For the official account A of the releaser A, users corresponding to the followed user account A1, the followed user account A2, and the followed user account A3 are usually users having relatively high interest to information released by the official account A. It can be predicted that the users also have relatively high interest to recommendation information released by the releaser A on the information recommendation platform.

Figure 2A:
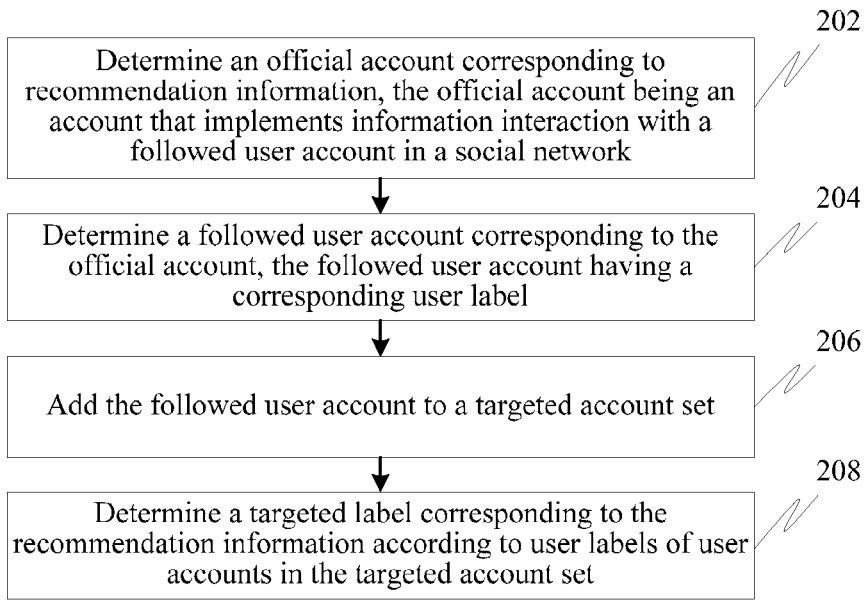
FIG. 2A is a flowchart of a method for generating a targeted label according to an example of this application.

Referring to FIG. 2A, FIG. 2A is a flowchart of a method for generating a targeted label according to an example of this application. In this example, applying the method for generating a targeted label to the server cluster 140 shown in FIG. 1 is used as an example for description. The method for generating a targeted label includes:

Step 202: Determine an official account corresponding to recommendation information, the official account being an account that implements information interaction with a followed user account in a social network.

Optionally, the recommendation information is information released by a releaser client on the server cluster.

The server cluster determines the official account corresponding to the recommendation information.

Schematically, the server cluster determines a first official account registered by a releaser (e.g., provider) of the recommendation information as the official account corresponding to the recommendation information.

For example, the releaser of the recommendation information is a releaser A, the server cluster determines an official account A registered by the releaser A as the official account corresponding to the recommendation information.

Schematically, the server cluster determines a second official account, an information correlation (or information correlation degree) between which and the recommendation information is greater than a first threshold as the official account corresponding to the recommendation information.

For example, the recommendation information is information related to automobiles, and the server cluster determines an official account C related to automobiles as the official account corresponding to the recommendation information. The information correlation between the official account C and the recommendation information is greater than a first threshold. Optionally, the information correlation is calculated by using the number of key words shared by information released by the official account and the recommendation information.

Optionally, there are two or more official accounts corresponding to the recommendation information.

Step 204: Determine a followed user account corresponding to the official account, the followed user account having a corresponding user label.

The official account has a plurality of corresponding followed user accounts, which are also referred to as fan users of the official account. The server cluster determines the followed user account corresponding to the official account.

Each followed user account has a corresponding user label in the server cluster. The user label is a label used to represent a user attribute. Optionally, the user label includes: at least one of age, gender, education, hobby, and home location.

Users of these followed user accounts are usually users having relatively high interest tendency for the recommendation information.

Step 206: Add the followed user account to a targeted account set (or a set of targeted user accounts).

The server cluster adds the followed user account to a targeted account set corresponding to the recommendation information.

Step 208: Determine a targeted label corresponding to the recommendation information according to user labels of user accounts in the targeted account set.

Figure 2B:
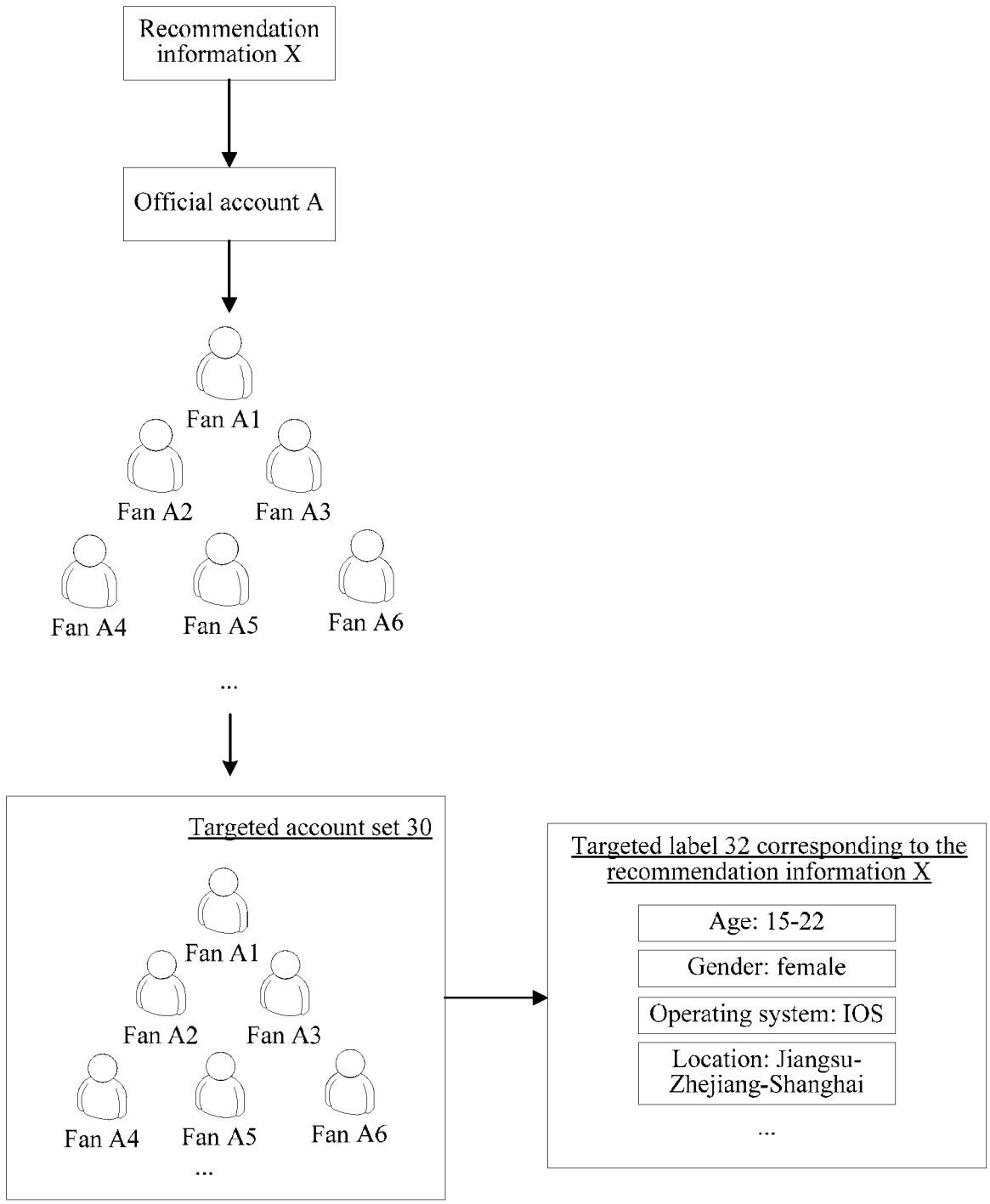
FIG. 2B is a schematic diagram of a method for generating a targeted label according to an example of this application.

Schematically, referring to FIG. 2B, a releaser registers an official account A in the social network platform, and when the releaser releases recommendation information X, the server cluster determines the official account A as the official account corresponding to the recommendation information X, and then queries followed user accounts: fan A1, fan A2, fan A3, fan A4, fan A5, fan A6, and the like corresponding to the official account A. The server cluster adds each fan to a targeted account set 30, and determines each user account in the targeted account set 30 as a user having relatively high interest tendency for the recommendation information X. Because each followed user account has a corresponding user label of itself, a targeted label 32 corresponding to the recommendation information X can be obtained by collecting statistics on and analyzing these user labels. Optionally, the targeted label 32 includes: age 15-22, gender female, operating system IOS, and location Jiangsu-Zhejiang-Shanghai.

Optionally, the server cluster determines a target account set (or a set of target user accounts) in the social network platform according to the targeted label, and sends the recommendation information to user clients of user accounts in the target account set.

In conclusion, a followed user account corresponding to an official account is usually an account registered by a user having a relatively high interest tendency for the official account, and therefore the followed user account corresponding to the related official account is determined, and then is added to a targeted account set, and a targeted label corresponding to recommendation information is determined according to user accounts in the targeted account set, so that a targeted label can be recommended for each piece of recommendation information based on a user having a relatively high interest tendency, so as to perform suitable and effective targeted advertising, thereby avoiding wasting computing resources and advertising resources on an advertisement platform.

Figure 3A:
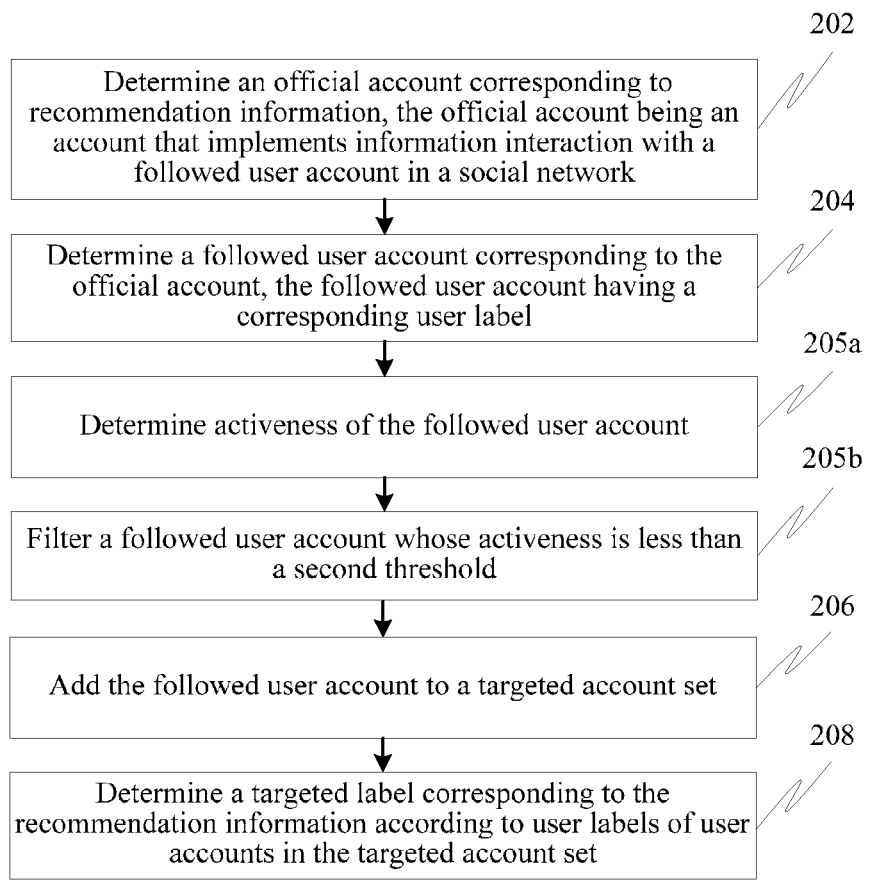
FIG. 3A is a flowchart of a method for generating a targeted label according to another example of this application.

In the optional example based on FIG. 2A, some user identities in followed user identities corresponding to the official account are registered by users having low activeness (or activity level), that is, lurk user identities or zombie user identities. These followed user identities may be filtered. In this case, before step 206, the method further includes step 205a and step 205b, as shown in FIG. 3A:

Step 205a: Determine activeness of the followed user account.

Optionally, the activeness is calculated by using at least one following factor: the frequency of sending, by a followed user account, a message to an official account, the frequency of using, by the followed user account, services provided by the official account, the frequency of viewing, by the followed user account, messages released by the official account, and the frequency of using, by the followed user account, a user client. The manner of calculating the activeness is not limited in this example.

The server cluster calculates the activeness of each followed user account. Schematically, Table 1 schematically shows the activeness of each followed user account.

TABLE 1

| Followed user account | Activeness |
|---|---|
| Fan A1 | 48 |
| Fan A2 | 91 |
| Fan A3 | 12 |
| Fan A4 | 6 |
| Fan A5 | 1 |
| Fan A6 | 49 |
| ... | ... |

Step 205b: Filter a followed user account whose activeness is less than a second threshold.

The server cluster filters the followed user account whose activeness is less than the second threshold, and adds a followed user account after the followed user account whose activeness is less than the second threshold is filtered to a targeted account set. The setting value of the second threshold is not limited in this example.

Figure 3B:
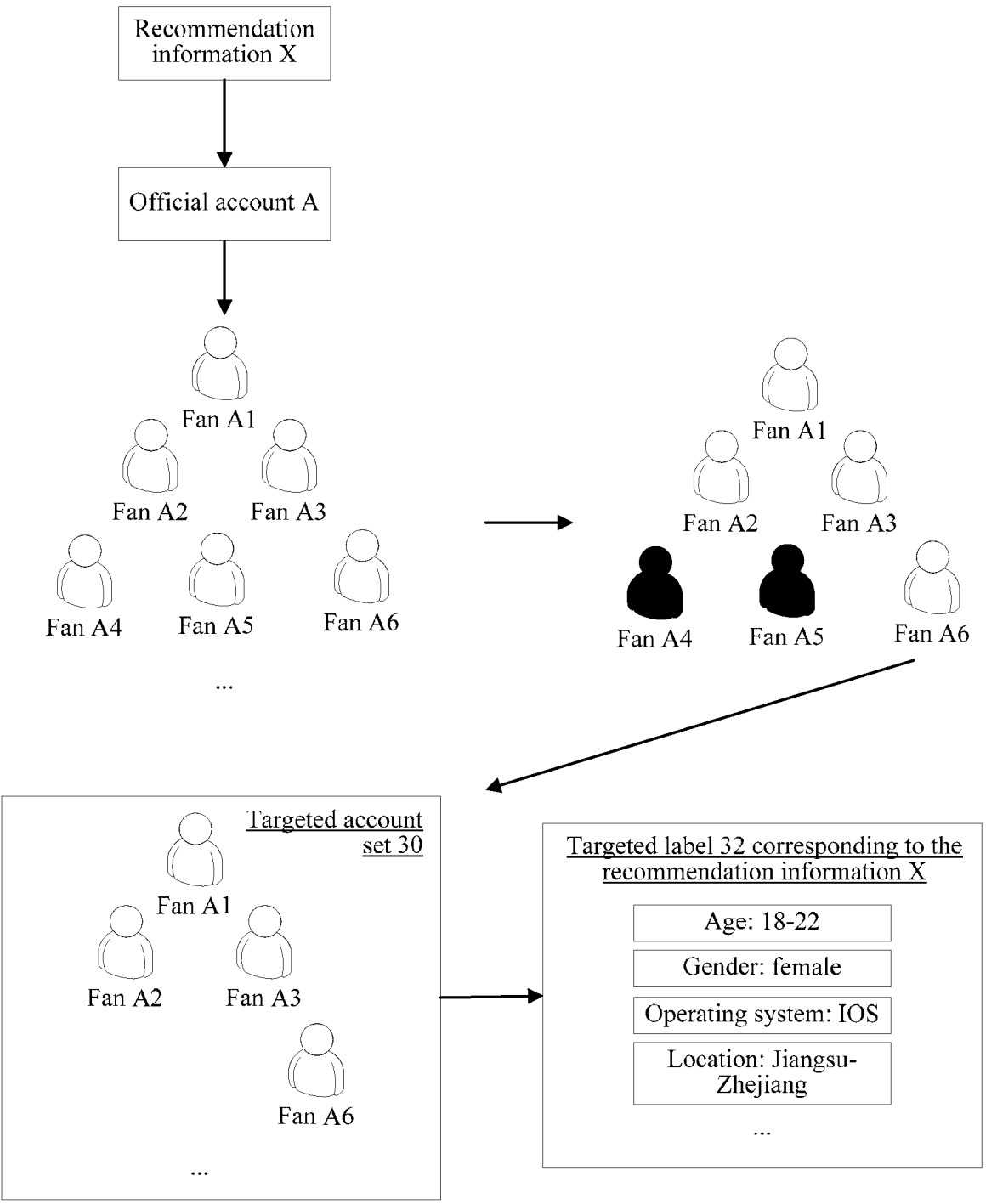
FIG. 3B is a schematic diagram of a method for generating a targeted label according to another example of this application.

Schematically referring to FIG. 3B, by using that the second threshold is 10 as an example, after a followed user identity corresponding to the official A is determined, the server cluster filters the fan A4 and the fan A5 according to the activeness.

In conclusion, according to the method for generating a targeted label provided in this example, a followed user account whose activeness is less than a second threshold is filtered, so that a followed user account having relatively low activeness is not added to a targeted account set, and only a followed user account having relatively high activeness is added to the targeted account set, thereby improving the accuracy of a finally determined targeted label.

Figure 4A:
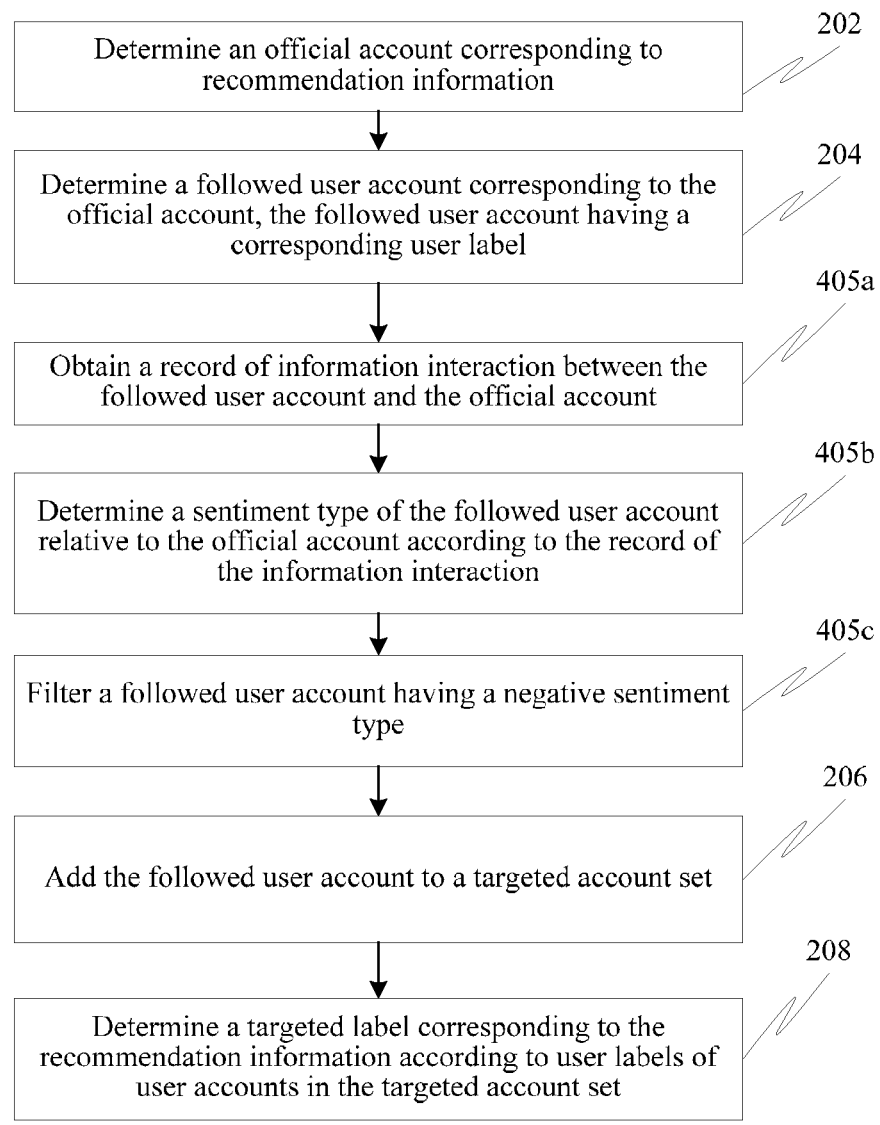
FIG. 4A is a flowchart of a method for generating a targeted label according to another example of this application.

In the optional example based on FIG. 2A, some user identities of followed user identities corresponding to the official account are user identities that do not like the official account, that is, user identities having negative sentiment. These followed user identities may be filtered. In this case, before step 206, the method further includes step 405a, step 405b, and step 405c, as shown in FIG. 4A:

Step 405a: Obtain a record of information interaction between the followed user account and the official account.

The record of information interaction includes: information sent by the followed user account to the official account, and/or, information sent by the official account to the followed user account.

Optionally, the information sent by the followed user account to the official account is used as the main content for analysis.

Step 405b: Determine a sentiment type (or a sentiment) of the followed user account relative to the official account according to the record of the information interaction, where the sentiment type includes: a positive sentiment type and a negative sentiment type.

A server group performs sentiment type identification on the record of information interaction by using a text sentiment analysis model. Optionally, the text sentiment analysis model is at least one of an analysis model based on emoticons and sentiment words, an analysis model based on a sentiment vector spatial model, an unsupervised text sentiment analysis model based on a subject sentiment hybrid model, and an analysis model based on a probabilistic graphical model. The manner of identifying a sentiment type is not limited in this example.

The sentiment type includes: a positive sentiment type and a negative sentiment type.

Step 405c: Filter a followed user account having a negative sentiment type.

The server cluster filters the followed user account having the negative sentiment type, and adds a followed user account after the followed user account having the negative sentiment type is filtered to a targeted account set. Optionally, the server cluster may also filter the followed user account having the negative sentiment type. The type of the filtered followed user account is not limited in this example.

Figure 4B:
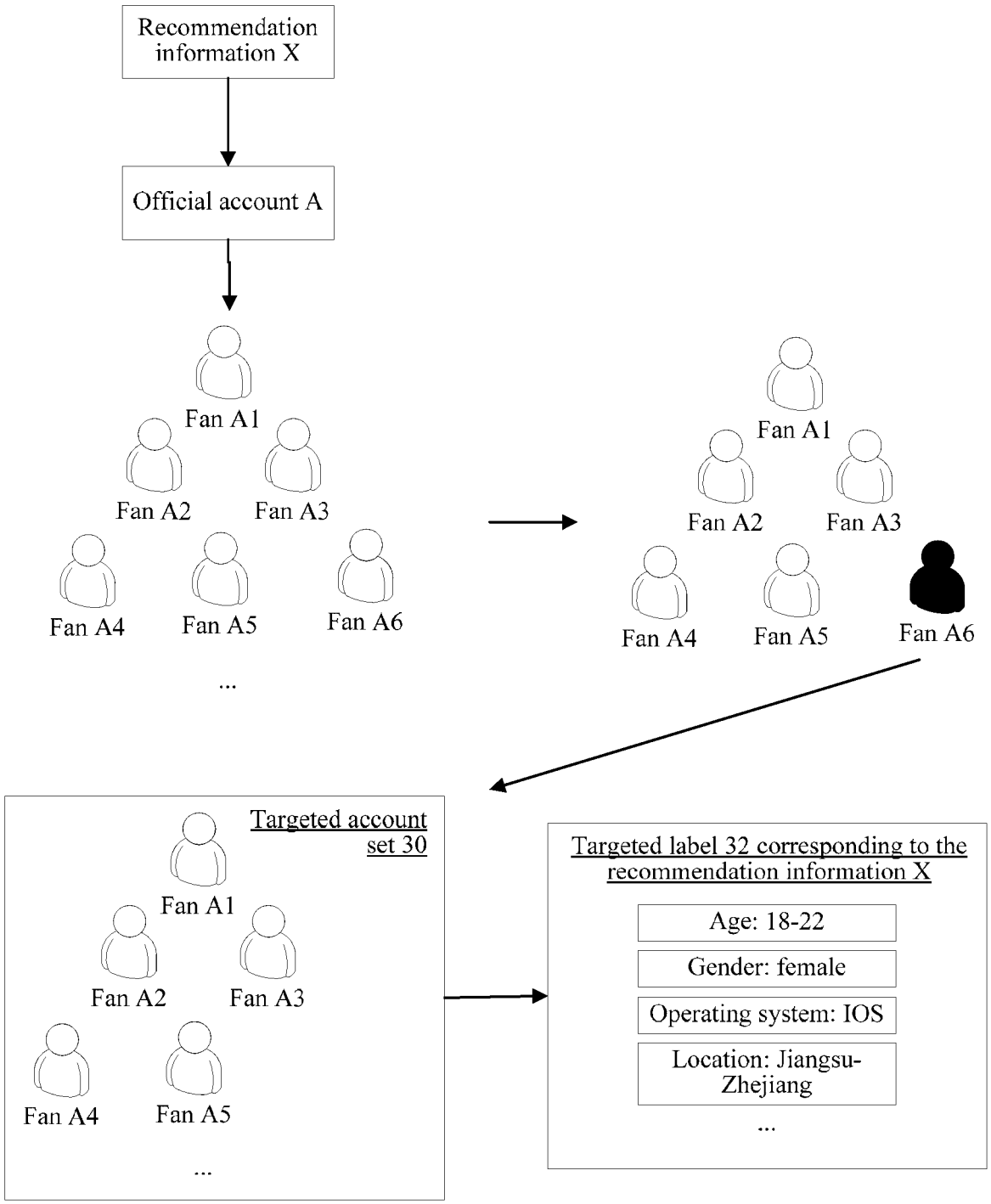
FIG. 4B is a schematic diagram of a method for generating a targeted label according to another example of this application.

Schematically, referring to FIG. 4B, by using that the followed user account having the negative sentiment type is a fan A6 as an example, after the followed user identity corresponding to the official account A is determined, the server cluster filters the fan A6 having the negative sentiment type.

In conclusion, according to the method for generating a targeted label provided in this example, a followed user account having a negative sentiment type is filtered, so that the followed user account having the negative sentiment type is not added to a targeted account set, and only a followed user account having a positive sentiment type is added to the targeted account set, thereby improving the accuracy of a finally determined targeted label.

Figure 5A:
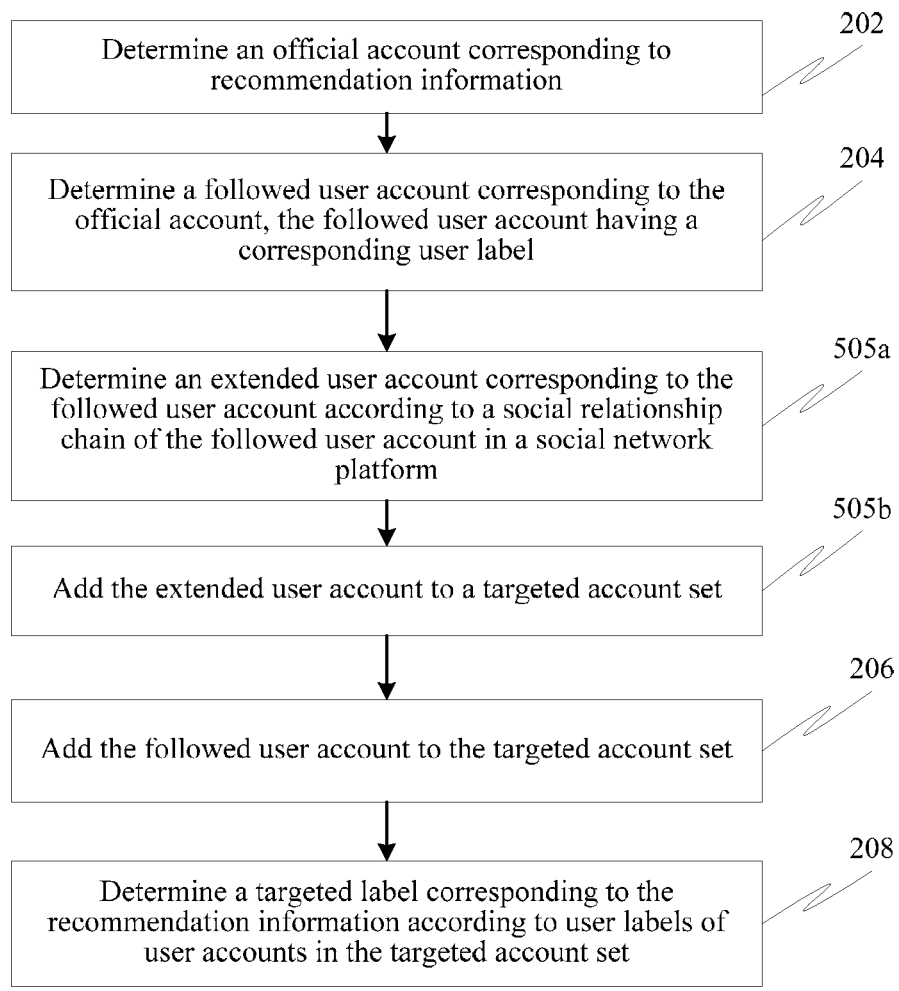
FIG. 5A is a flowchart of a method for generating a targeted label according to another example of this application.

In the optional example based on FIG. 2A, because the official account may be a newly registered official account, and there is a relatively small number of followed user identities corresponding to the official account. To increase the number of user identities for analysis in a targeted account set, in this case, before step 206, the method further includes step 505a and step 505b, as shown in FIG. 5A:

Step 505a: Determine an extended user account corresponding to the followed user account according to a social relationship chain (or a degree of relationship) of the followed user account in a social network platform.

Optionally, the server cluster determines a user account, an intimacy between which and the followed user account is greater than a preset threshold as an extended user account corresponding to the followed user account according to the social relationship chain of the followed user account in the social network platform.

For example, the followed user account A1 has a friend B1, a friend B2, and a friend B3, and the intimacy between the friend B1 and the followed user account A1 is highest, the intimacy between the friend B3 and the followed user account A1 is intermediate, and the intimacy between the friend B2 and the followed user account A1 is lowest, the server cluster determines the friend B1 as the extended user account corresponding to the followed user account A1.

For another example, the followed user account A2 has a friend C1, a friend C2, and a friend C3, and the intimacy between the friend C1 and the followed user account A1 is greater than a preset threshold, the intimacy between the friend C2 and the followed user account A1 is also greater than the preset threshold, and the intimacy between the friend C3 and the followed user account A1 is not greater than the preset threshold, the server cluster determines the friends C1 and C2 as the extended user accounts corresponding to the followed user account A2.

Optionally, the server cluster inputs the followed user account and the social relationship chain into a Lookalike (similar people extension) model, and determines the extended user account according to an output result of the Lookalike model. The manner of determining the extended user account, the condition of determining the intimacy, and the setting of the preset threshold are not limited in this example.

Step 505b: Add the extended user account to a targeted account set.

The server cluster adds the extended user account to the targeted account set.

Figure 5B:
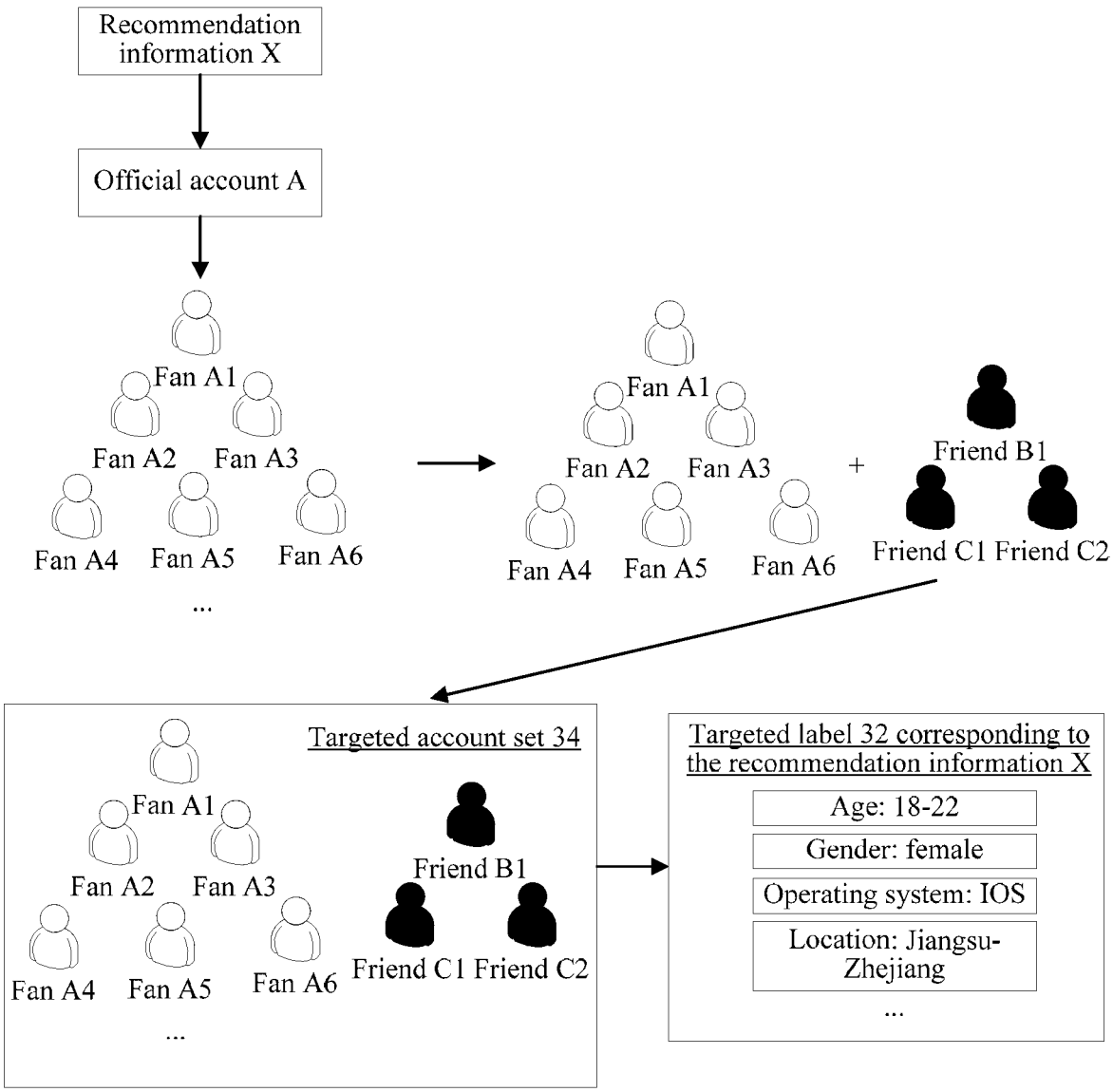
FIG. 5B is a schematic diagram of a method for generating a targeted label according to another example of this application.

Schematically, referring to FIG. 5B, after determining that the friend B1, the friend C1, and the friend C2 are the extended user accounts, the server cluster adds the friend B1, the friend C1, and the friend C2 to a targeted account set 34.

In conclusion, according to the method for generating a targeted label provided in this example, an extended user account corresponding to a followed user account can be obtained based on a social relationship chain of the followed user account, to increase the number of user accounts in a targeted account set, so that the number of user labels for analysis in the targeted account set increases, thereby improving the accuracy of a finally determined targeted label.

Figure 6A:
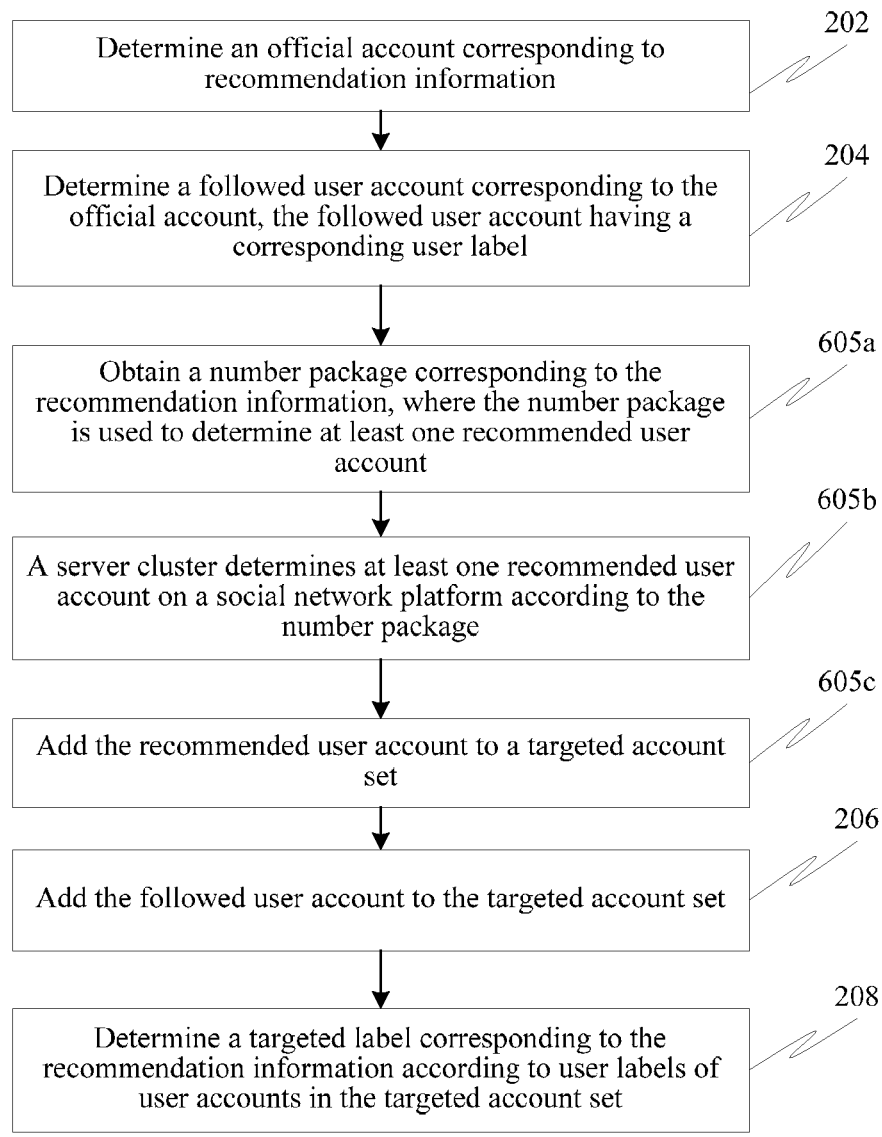
FIG. 6A is a flowchart of a method for generating a targeted label according to another example of this application.

In the optional example based on FIG. 2A, because the official account may be a newly registered official account, and there is a relatively small number of followed user identities corresponding to the official account. To increase the number of user identities for analysis in a targeted account set, in this case, before step 206, the method further includes step 605a, step 605b, and step 605c, as shown in FIG. 6A:

Step 605a: Obtain a number package (user identifying information) corresponding to the recommendation information, where the number package is used to determine at least one recommended user account.

Optionally, the releaser has a part of the number package, which includes a name, a fixed telephone number, a mobile phone number, a home address, and other information of a user that is interested in the recommendation information. The number package is used to determine at least one recommended user account.

A releaser sends the number package to the server cluster by using a releaser client. Correspondingly, the server cluster receives the number package sent by the releaser client.

Step 605b: A server cluster determines at least one recommended user account on a social network platform according to the number package.

Schematically, the number package includes a name of a user, and the server cluster queries a recommended user account on the social network platform according to the name; or the number package includes a fixed telephone number, and the server cluster queries the recommended user account on the social network platform according to the fixed telephone number; or the number package includes a mobile phone number, and the server cluster queries the recommended user account on the social network platform according to the mobile phone number.

Step 605c: Add the recommended user account to a targeted account set.

The server cluster adds the recommended user account to the targeted account set.

Figure 6B:
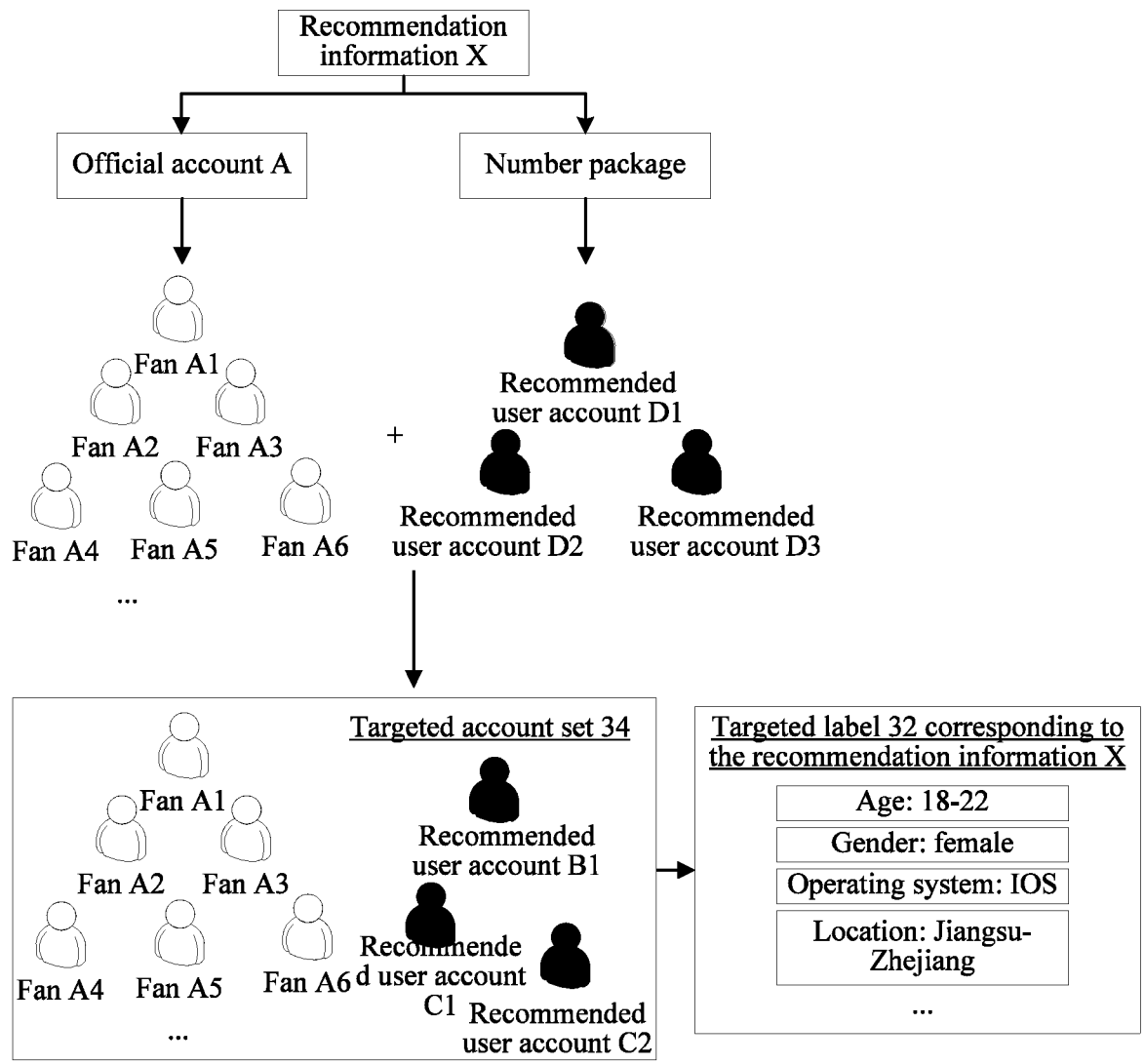
FIG. 6B is a schematic diagram of a method for generating a targeted label according to another example of this application.

Schematically referring to FIG. 6B, after determining a recommended user account D1, a recommended user account D2, and a recommended user account D3 according to the number package, the server cluster adds the recommended user account D1, the recommended user account D2, and the recommended user account D3 to a targeted account set 34.

In conclusion, according to the method for generating a targeted label provided in this example, at least one recommended user account is determined by using a number package provided by a releaser, and the recommended user account is added to a targeted account set, to increase the number of user accounts in the targeted account set, so that the number of user labels for analysis in the targeted account set increases, thereby improving the accuracy of a finally determined targeted label.

It should be noted that the examples shown in FIG. 4A to FIG. 6A may be implemented by combining any two examples, any three examples, or all four examples. This can be easily conceived of by a person skilled in the art according to the foregoing examples. The manner of implementation by combining the examples is not described in detail again in this example of this application. The manner of implementation by combining all the foregoing four examples is illustrated by using only one specific schematic example, and the details are described as follows.

Figure 7A:
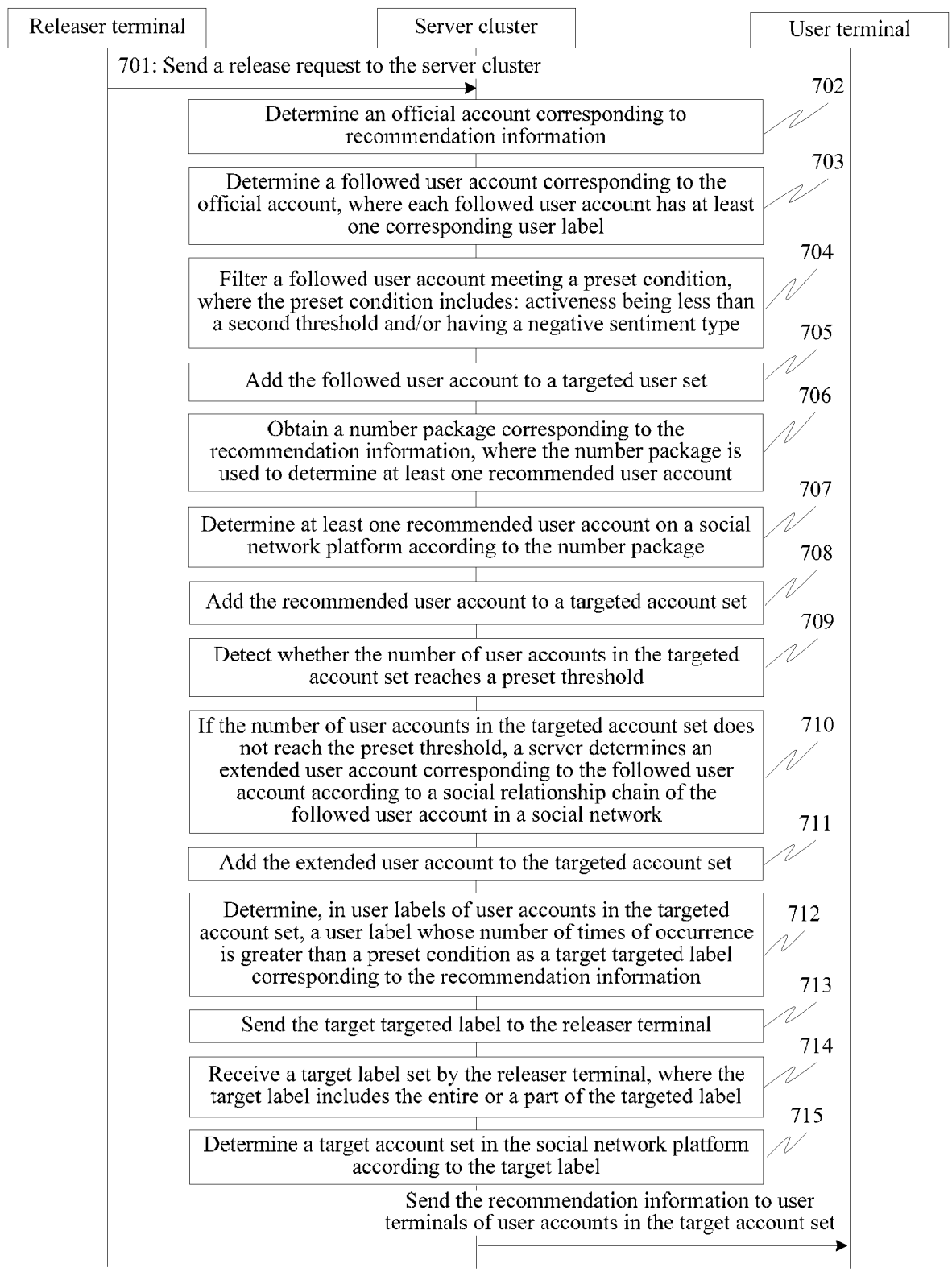
FIG. 7A is a flowchart of a method for generating a targeted label according to another example of this application.

Referring to FIG. 7A, FIG. 7A is a flowchart of a method for sending recommendation information according to another example of this application. In this example, applying the method for sending recommendation information to the system for sending recommendation information shown in FIG. 1 is used as an example for description. The method includes:

Step 701: a releaser terminal sends a release request to a server cluster, where the release request includes a releaser identifier and recommendation information.

Optionally, the releaser terminal sends the release request to an information recommendation platform. Correspondingly, the information recommendation platform receives the release request sent by the releaser terminal.

The information recommendation platform obtains a releaser identifier and the recommendation information from the release request.

Step 702: A server cluster determines an official account corresponding to the recommendation information.

The information recommendation platform determines a first official account registered by a releaser of the recommendation information as the official account corresponding to the recommendation information. Optionally, the information recommendation platform queries, from the social network platform according to the releaser identifier, the first official account registered by the releaser identifier.

And/or, the information recommendation platform determines a second official account, an information correlation between which and the recommendation information is greater than a first threshold as the official account corresponding to the recommendation information. The second official account is not necessarily an official account registered by the releaser.

Step 703: the server cluster determines a followed user account corresponding to the official account, where each followed user account has at least one corresponding user label.

The information recommendation platform queries, from the social network platform according to the official account, the followed user account corresponding to the official account and a user label of each followed user account.

Optionally, the user label includes: at least one of the age, gender, region, interest, and operating system.

Step 704: The server cluster filters a followed user account meeting a preset condition, where the preset condition includes: activeness being less than a second threshold and/or having a negative sentiment type.

Optionally, the information recommendation platform determines activeness of each followed user account, and filters a followed user account whose activeness is less than the second threshold.

For example, the activeness is determined according to the activeness of the followed user account on the social network platform in a most recent week. The second threshold is that the followed user identity logs in to the social network platform at least once each day in the most recent week. For another example, the activeness is determined according to a record of information interaction between the followed user account and the official account in a most recent month. The second threshold is that there is at least one record of information interaction between the followed user identity and the official account in the most recent month. The record of information interaction includes: the followed user account reads articles published by the official account, and the followed user account sends messages to the official account.

Optionally, the information recommendation platform determines a sentiment type of the followed user account relative to the official account, and filters a followed user account having a negative sentiment type.

In this step, noise data in the followed user account can be filtered, so that a followed user account having higher reference value is kept.

Step 705: The server cluster adds the followed user account to a targeted user set.

Optionally, the information recommendation platform adds the followed user account after filtration to a targeted user set.

Step 706: The server cluster obtains a number package corresponding to the recommendation information, where the number package is used to determine at least one recommended user account.

Optionally, when the releaser does not have an official account registered by the releaser, the releaser uploads the number package to the information recommendation platform by using the releaser terminal. The information recommendation platform obtains the number package corresponding to the recommendation information.

Optionally, when the releaser hopes to set target release people by himself, the releaser uploads the number package to the information recommendation platform by using the releaser terminal. The information recommendation platform obtains the number package corresponding to the recommendation information.

Step 707: the server cluster determines at least one recommended user account on a social network platform according to the number package.

Schematically, the number package includes a name of a user, and the server cluster queries a recommended user account on the social network platform according to the name; or the number package includes a fixed telephone number, and the server cluster queries the recommended user account on the social network platform according to the fixed telephone number; or the number package includes a mobile phone number, and the server cluster queries the recommended user account on the social network platform according to the mobile phone number.

Step 708: the server cluster adds the recommended user account to a targeted account set.

Optionally, step 706 to step 708 are optional steps, and when the releaser does not upload the number package, step 706 to step 708 are omitted.

Optionally, the sequence of performing step 706 to step 708 is not limited in this example, provided that step 706 to step 708 are performed before step 712.

Step 709: The server cluster detects whether the number of user accounts in the targeted account set reaches a preset number.

When the number of user accounts in the targeted account set is excessively small, an accurate recommendation result cannot be obtained. The information recommendation platform detects whether the number of user accounts in the targeted account set reaches a preset number.

If the number of user accounts in the targeted account set does not reach the preset number, step 710 is entered; and if the number of user accounts in the targeted account set has reached the preset number, step 712 is entered.

Step 710: If the number of user accounts in the targeted account set does not reach a preset threshold, the server cluster determines an extended user account corresponding to the followed user account according to a social relationship chain of the followed user account in the social network platform.

The information recommendation platform obtains the social relationship chain of the followed user account from the social network platform.

The information recommendation platform inputs the followed user account and the social relationship chain into a Lookalike model, and determines the extended user account according to an output result of the Lookalike model.

Step 711: Add the extended user account to the targeted account set.

Step 712: Analyze, in user labels of user accounts in the targeted account set, a user label whose number of times of occurrence is greater than a preset condition, and determine the user label whose number of times of occurrence is greater than the preset condition as a targeted label corresponding to the recommendation information.

The user label includes: at least one of the age, gender, region, interest, and operating system. In this example, that the user label includes all the five user labels is used as an example for description. A user label of a same type may be divided into a plurality of value ranges according to different values.

This step is implemented in any one of the following three implementation manners:

First implementation manner: the information recommendation platform separately collects statistics on the number of times of occurrence of user labels of different types, sorts the numbers of times of occurrence of sub user labels corresponding to different value ranges of a user label of a same type, and determines a recommended targeted label according to a sub user label of a value range having a largest number of times of occurrence.

Schematically, statistics are respectively collected on user labels of a total of five types: age, gender, region, interest, and operating system.

By using that the user label "age" includes sub user labels of three value ranges as an example, the statistical result is shown in Table 2:

TABLE 2

| Age | Number of times of occurrence |
|---|---|
| [16, 20] | 7 |
| [21, 25] | 2 |
| [31, 35] | 1 |

By using that the user label "gender" includes sub user labels of two value ranges as an example, the statistical result is shown in Table 3:

TABLE 3

| Gender | Number of times of occurrence |
|---|---|
| Female | 9 |
| Male | 1 |

By using that the user label "region" includes sub user labels of three value ranges as an example, the statistical result is shown in Table 4:

TABLE 4

| Region | Number of times of occurrence |
|---|---|
| Beijing | 4 |
| Shenzhen | 3 |
| Shanghai | 3 |

By using that the user label "operating system" includes sub user labels of two value ranges as an example, the statistical result is shown in Table 5:

TABLE 5

| Operating system | Number of times of occurrence |
|---|---|
| IOS | 6 |
| Android | 4 |

By using that the user label "interest" includes sub user labels of five value ranges as an example, the statistical result is shown in Table 6:

TABLE 6

| Interest | Number of times of occurrence |
|---|---|
| Delicious food | 4 |
| Photography | 3 |
| Reading | 1 |
| Star chasing | 1 |
| Singing | 1 |

Then, the server cluster determines sub user labels that have a largest number of times of occurrence in the user labels: age [16, 20], gender "female", region "Beijing", operating system "IOS", and interest "delicious food" as a targeted label corresponding to the recommendation information.

Second implementation manner: the information recommendation platform divides a plurality of user label groups according to user labels of different types. Each user label group includes several sub user labels. Any two sub user labels belong to different user label types. For each user label group, statistics are collected on the number of times of occurrence of a user account that meets all the sub user labels in the user label group, and a user label group having a largest number of times of occurrence is determined as a recommended targeted label.

Schematically, a plurality of user label groups are divided according to user labels of a total of five types: age, gender, region, interest, and operating system. Statistics are separately collected on the number of times of occurrence of a user account for each user label group. Schematically, as shown in Table 7:

TABLE 7

| Age | Gender | Region | Operating system | Interest | Number of times of occurrence |
|---|---|---|---|---|---|
| [16, 20] | Female | Shenzhen | IOS | Photography | 52 |
| [16, 20] | Female | Shenzhen | IOS | Delicious food | 10 |
| [16, 20] | Female | Beijing | IOS | Delicious food | 128 |
| [16, 20] | Male | Shenzhen | Android | Singing | 23 |
| ... | ... | ... | ... | ... | ... |

Then, the server determines a user label group that has a largest number of times of occurrence: age [16, 20], gender "female", region "Beijing", operating system "IOS", and interest "delicious food" as a targeted label corresponding to the recommendation information.

Third implementation manner: the information recommendation platform builds a tree in a branching manner on user labels of various types according to a machine learning tree model, and uses user labels on a path on which leaf nodes cover a largest number of people as a recommended targeted label.

Optionally, the information recommendation platform builds a tree in a branching manner on sub user labels according to different types of user labels, and stores the sub user labels in a tree structure according to a type to which each sub user label belongs. A first-level type corresponds to a root node, and sub types of various levels under the first-level type correspond to intermediate nodes or leaf nodes of various levels. When there is no sub type under the first-level type, a node corresponding to the first-level type is referred to as a leaf node.

Figure 7B:
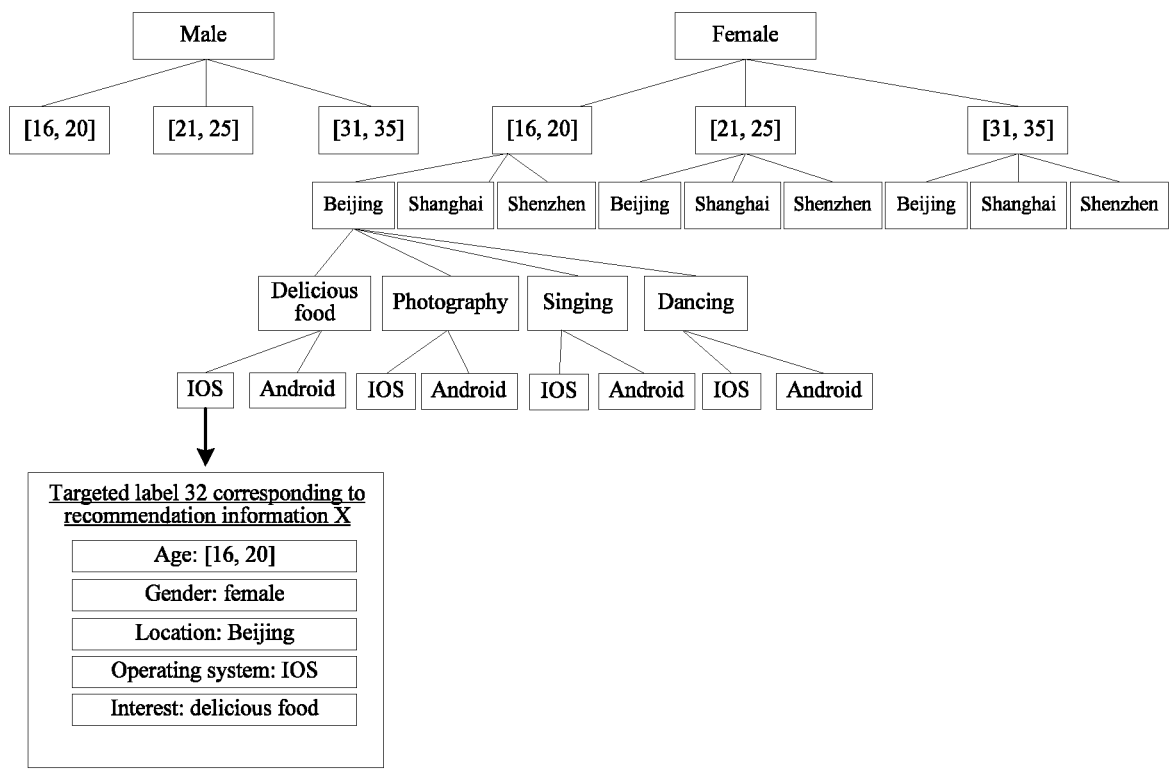
FIG. 7B is a schematic diagram of an interface of a method for generating a targeted label according to another example of this application.

Schematically, as shown in FIG. 7B, the server cluster divides first-level types of user labels into male and female according to the gender. Further, for the female, second-level sub types such as [16, 20], [21, 25], and [31, 35] are divided according to different age groups of them. For the female whose age group is [16, 20], third-level sub types such as Beijing, Shanghai, and Shenzhen are further divided according to regions of them. Furthermore, for the female whose age group is [16, 20] and who are located in Beijing, fourth-level sub types such as delicious food, photography, singing, and dancing are divided according to the interest. Furthermore, for the female whose age group is [16, 20] and who are located in Shanghai, fifth-level sub types such as IOS and Android are divided according to the operating system.

Then, the server uses the user labels on a path having a largest number of times of occurrence in leaf nodes: age [16, 20], gender "female", region "Beijing", operating system "IOS", and interest "delicious food" as a targeted label corresponding to the recommendation information.

Optionally, according to the foregoing division method, user labels are divided according to types of the five levels. In other examples, division may also be performed according to types of one, two, three, four, or six levels. The manner of dividing user labels in the tree storage structure is not limited in the technical solution provided in this example of this application. Correspondingly, the manner for building a tree in a branching manner by the information recommendation platform is not limited in this example.

It should be noted that although three different manners of determining a targeted label are introduced in this step, the manner of determining a targeted label by a server cluster is not limited in this example.

Step 713: The server cluster sends the targeted label corresponding to the recommendation information to the releaser terminal.

The information recommendation platform sends the targeted label corresponding to the recommendation information to the releaser terminal.

Correspondingly, the releaser terminal receives the targeted label corresponding to the recommendation information.

Step 714: the server cluster receives a target targeted label (provider selected targeted label) set by the releaser terminal, where the target targeted label includes the entire or a part of the targeted label.

When the releaser completely adopts the targeted label recommended by the information recommendation platform, the target targeted label includes the entire targeted label, and when the releaser does not completely adopt the targeted label recommended by the information recommendation platform, the target targeted label includes a part of the targeted label.

Step 715: the server cluster determines a target account set in the social network platform according to the target targeted label.

The information recommendation platform determines the target account set in all user accounts by using the target targeted label. The target account set is used to indicate a target user group of the recommendation information.

Optionally, the target account set is a subset, a universal set, or a superset of the targeted account set. Usually, the target account set is the superset of the targeted account set. For example, the targeted account set includes 100 user accounts. The target account set includes 10000 user accounts.

Step 716: The server cluster sends the recommendation information to user terminals of user accounts in the target account set.

Optionally, the information recommendation platform sends the recommendation information to user terminals of user accounts in the target account set by using the social network platform.

Figure 8:
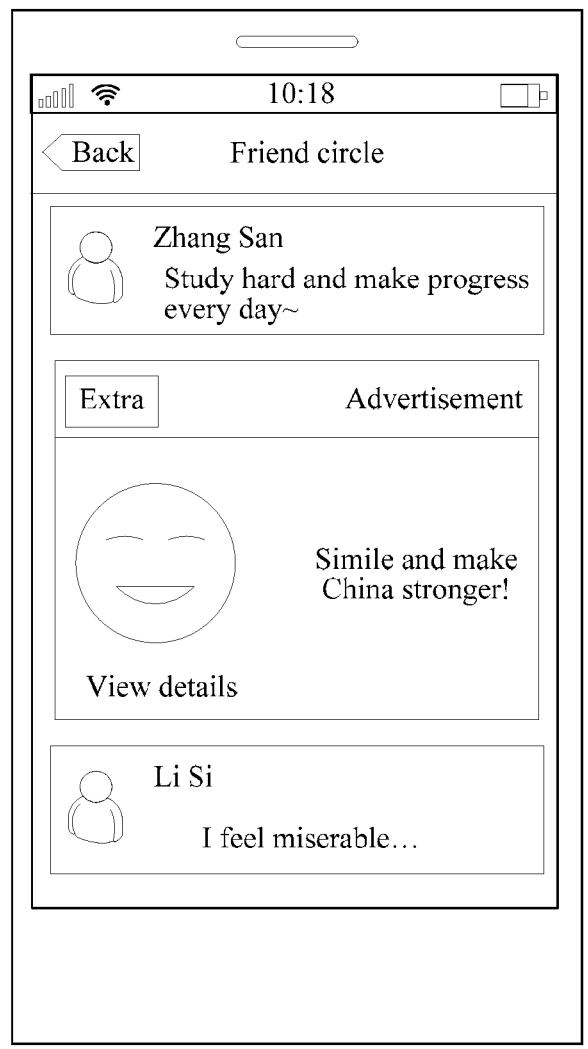
FIG. 8 is a schematic diagram of an interface of a method for generating a targeted label according to another example of this application.

As shown in FIG. 8, by using that the social network platform is a WeChat communication platform as an example, the recommendation information is advertisement information "teeth healthy gum-smile and make China stronger", and the information recommendation platform sends the advertisement information "teeth healthy gum-smile and make China stronger" to a WeChat client in the user terminal, and displays the advertisement information "teeth healthy gum-smile and make China stronger" by using the WeChat client.

In conclusion, a followed user account corresponding to an official account is usually an account registered by a user having a relatively high interest tendency for the official account, and therefore the followed user account corresponding to the related official account is determined, and then is added to a targeted account set, and a targeted label corresponding to recommendation information is determined according to user accounts in the targeted account set, so that a targeted label can be recommended for each piece of recommendation information based on a user having a relatively high interest tendency, so as to perform suitable and effective targeted advertising, thereby avoiding wasting computing resources and advertising resources on an advertisement platform.

Figure 9:
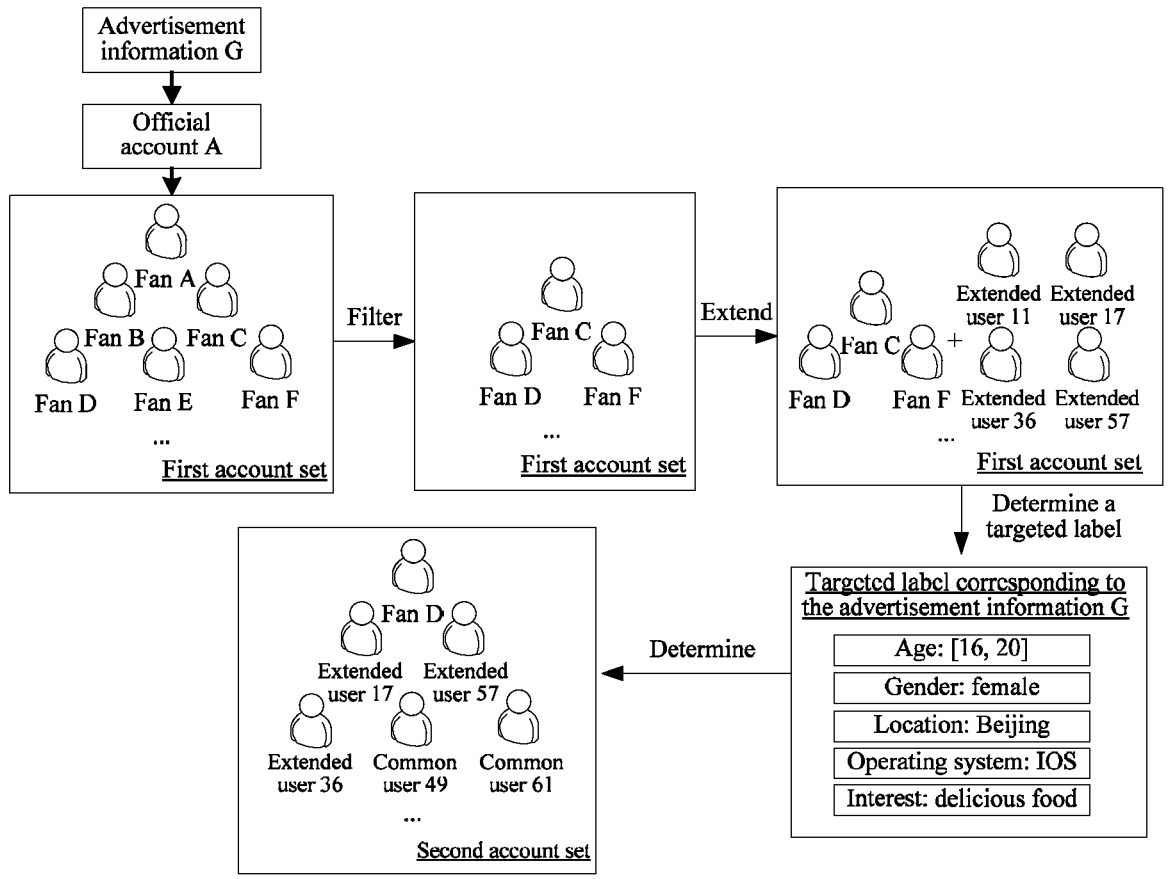
FIG. 9 is a schematic diagram of an interface of a method for generating a targeted label according to another example of this application.

Referring to FIG. 9, in a specific example, a social network platform is a WeChat platform, an information recommendation platform is an advertisement platform, and an official account is an official account on the WeChat platform. An advertiser releases advertisement information G on the advertisement platform. The advertisement platform determines an official account A registered by the advertiser on the WeChat platform as an official account corresponding to the advertisement information G, searches, on the WeChat platform, for fan users corresponding to the official account A, filters zombie fan users and fan users having a negative sentiment type from the fan users, and then adds fan users after filtration to a first account set.

When the number of fan users in the first account set is relatively small, the advertisement platform mines similar people based on fan users on the WeChat platform to obtain extended users. The advertisement platform also adds the extended users to the first account set. Then the advertisement platform determines, based on user labels of user accounts in the first account set, that a targeted label corresponding to the advertisement information G includes: age [16, 20], gender "female", location "Beijing", operating system "IOS", and interest "delicious food".

The advertisement platform recommends the targeted label corresponding to the advertisement information G to the advertiser. If the advertiser adopts the targeted label, the advertisement platform determines a second account set in all user accounts based on the targeted label, uses user accounts in the second account set as a target user group of the advertisement information G, and sends the advertisement information G to the user accounts in the second account set.

Apparatus examples in this application are described below. Reference may be made to the foregoing method examples having one-to-one correspondence to the apparatus examples for details that are not described in detail in the apparatus examples.

Figure 10:
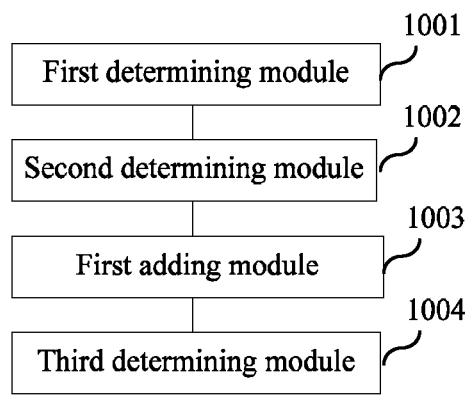
FIG. 10 is a schematic structural diagram of an apparatus for generating a targeted label according to an example of this application.

Referring to FIG. 10, FIG. 10 is a schematic structural diagram of an apparatus for generating a targeted label according to an example of this application. The apparatus may be implemented as the entire or a part of a server cluster by means of software, hardware, or a combination thereof. The apparatus includes: a first determining module 1001, a second determining module 1002, a first adding module 1003, and a third determining module 1004.

The first determining module 1001 is configured to determine an official account corresponding to recommendation information, the official account being an account that implements information interaction with a followed user account in a social network platform.

The server cluster determines the official account corresponding to the recommendation information.

Schematically, the server cluster determines a first official account registered by a releaser of the recommendation information as the official account corresponding to the recommendation information.

Schematically, the server cluster determines a second official account, an information correlation between which and the recommendation information is greater than a first threshold as the official account corresponding to the recommendation information.

The second determining module 1002 is configured to determine a followed user account corresponding to the official account, the followed user account having a corresponding user label.

The first adding module 1003 is configured to add the followed user account to a targeted account set.

The third determining module 1004 is configured to determine a targeted label corresponding to the recommendation information according to user labels of user accounts in the targeted account set.

In conclusion, a followed user account corresponding to an official account is usually an account registered by a user having a relatively high interest tendency for the official account, and therefore the followed user account corresponding to the related official account is determined, and then is added to a targeted account set, and a targeted label corresponding to recommendation information is determined according to user accounts in the targeted account set, so that a targeted label can be recommended for each piece of recommendation information based on a user having a relatively high interest tendency, so as to perform suitable and effective targeted advertising, thereby avoiding wasting computing resources and advertising resources on an advertisement platform.

Figure 11:
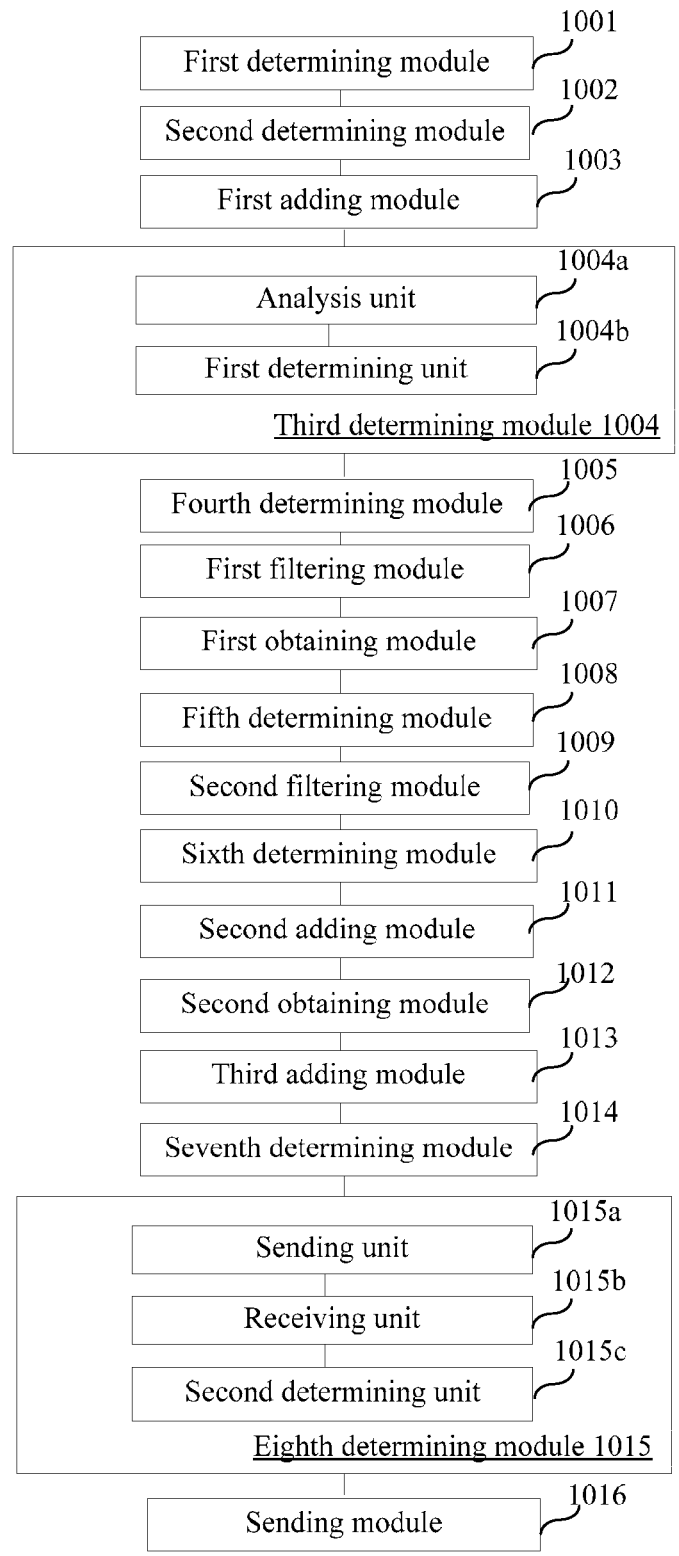
FIG. 11 is a schematic structural diagram of an apparatus for generating a targeted label according to another example of this application.

Referring to FIG. 11, FIG. 11 is a schematic structural diagram of an apparatus for generating a targeted label according to another example of this application. This example is an example provided based on the example shown in FIG. 10. The apparatus further includes:

a fourth determining module 1005 and a first filtering module 1006.

The fourth determining module 1005 is configured to determine activeness of the followed user account.

The first filtering module 1006 is configured to filter a followed user account whose activeness is less than a second threshold.

The apparatus further includes:

a first obtaining module 1007, a fifth determining module 1008, and a second filtering module 1009.

The first obtaining module 1007 is configured to obtain a record of the information interaction between the followed user account and the official account.

The fifth determining module 1008 is configured to determine a sentiment type of the followed user account relative to the official account according to the record of the information interaction, where the sentiment type includes: a positive sentiment type and a negative sentiment type.

The second filtering module 1009 is configured to filter a followed user account having the negative sentiment type.

The apparatus further includes:

a sixth determining module 1010 and a second adding module 1011.

The sixth determining module 1010 is configured to determine an extended user account corresponding to the followed user account according to a social relationship chain of the followed user account in the social network.

The second adding module 1011 is configured to add the extended user account to a targeted account set.

The apparatus further includes:

a second obtaining module 1012, a seventh determining module 1013, and a third adding module 1014.

The second obtaining module 1012 is configured to obtain a number package corresponding to the recommendation information, where the number package is used to determine at least one recommended user account.

The seventh determining module 1013 is configured to determine at least one recommended user account on the social network platform according to the number package.

The third adding module 1014 is configured to add the recommended user account to the targeted account set.

The third determining module 1004 includes:

an analysis unit 1004a and a first determining unit 1004b.

The analysis unit 1004a is configured to analyze a user label whose number of times of occurrence is greater than a preset condition in the user labels of the user accounts in the targeted account set.

The first determining unit 1004b is configured to determine the user label whose number of times of occurrence is greater than the preset condition as a targeted label corresponding to the recommendation information.

The apparatus further includes:

an eighth determining module 1015 and a sending module 1016.

The eighth determining module 1015 is configured to determine a target account set in the social network platform according to the targeted label.

The sending module 1016 is configured to send the recommendation information to user clients of user accounts in the target account set.

The eighth determining module 1015 includes:

a sending unit 1015a, a receiving unit 1015b, and a second determining unit 1015c.

The sending unit 1015a is configured to send the targeted label to a client of the releaser of the recommendation information.

The receiving unit 1015b is configured to receive a target targeted label set by the releaser, where the target targeted label includes the entire or a part of the targeted label.

The second determining unit 1015 is configured to determine the target account set in the social network platform according to the target targeted label. Optionally, the recommendation information is advertisement information.

In conclusion, a followed user account corresponding to an official account is usually an account registered by a user having a relatively high interest tendency for the official account, and therefore the followed user account corresponding to the related official account is determined, and then is added to a targeted account set, and a targeted label corresponding to recommendation information is determined according to user accounts in the targeted account set, so that a targeted label can be recommended for each piece of recommendation information based on a user having a relatively high interest tendency, so as to perform suitable and effective targeted advertising, thereby avoiding wasting computing resources and advertising resources on an advertisement platform.

Figure 12:
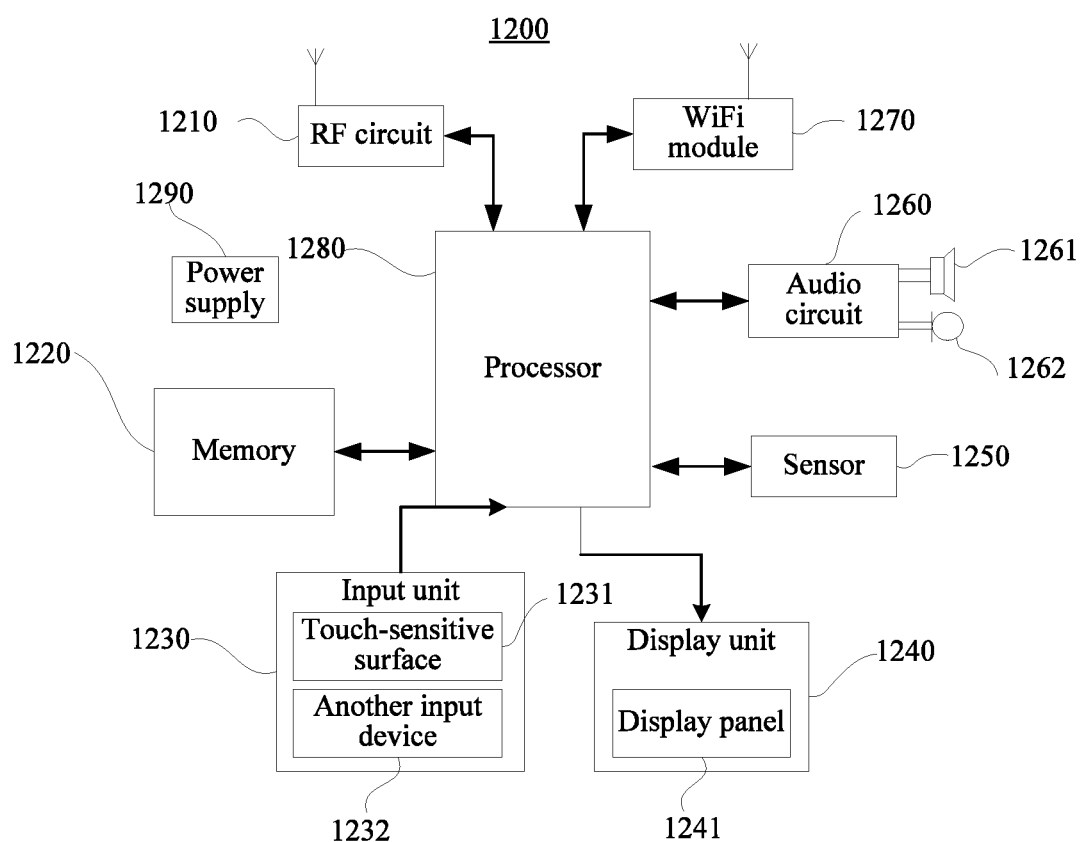
FIG. 12 is a structural block diagram of a terminal according to an example of this application.

Referring to FIG. 12, FIG. 12 is a block diagram of a terminal 1200 according to an example of this application. The terminal may run a releaser client or a user client. For example, the device 1200 may include components such as a radio frequency (RF) circuit 1210, a memory 1220 including one or more computer readable storage media, an input unit 1230, a display unit 1240, a sensor 1250, an audio circuit 1260, a wireless fidelity (WiFi) module 1270, a processor 1280 including one or more processing cores, and a power supply 1290. A person skilled in the art may understand that the structure of the device shown in FIG. 12 does not constitute a limitation to the device, and the device may include more components or fewer components than those shown in the figure, or some components may be combined, or a different component deployment may be used.

The RF circuit 1210 may be configured to receive and send signals during an information receiving and sending process or a call process. Particularly, the RF circuit 1210 receives downlink information from a base station, then delivers the downlink information to one or more processors 1280 for processing, and sends related uplink data to the base station. Generally, the RF circuit 1210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 1210 may also communicate with a network and another device by wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, and Short Messaging Service (SMS). The memory 1220 may be configured to store a software program and module. The processor 1280 runs the software program and module stored in the memory 1220, to implement various functional applications and data processing. The memory 1220 may mainly include a program storage area and a data storage area. The program storage area may store an operating system, an application program required by at least one function (such as a sound playback function and an image display function), and the like. The data storage area may store data (such as audio data and an address book) created according to use of the device 1200, and the like. In addition, the memory 1220 may include a high speed random access memory, and may also include a non-volatile memory, such as at least one magnetic disk storage device, a flash memory, or another volatile solid-state storage device. Correspondingly, the memory 1220 may further include a memory controller, to provide access of the processor 1280 and the input unit 1230 to the memory 1220.

The input unit 1230 may be configured to receive input digit or character information, and generate a keyboard, mouse, joystick, optical, or track ball signal input related to the user setting and function control. For example, the input unit 1230 may include a touch-sensitive surface 1231 and another input device 1232. The touch-sensitive surface 1231, also referred to as a touchscreen or a touch panel, may collect a touch operation of a user on or near the touch-sensitive surface (such as an operation of a user on or near the touch-sensitive surface 1231 by using any suitable object or accessory, such as a finger or a stylus), and drive a corresponding connection apparatus according to a preset program. Optionally, the touch-sensitive surface 1231 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1280. Moreover, the touch controller can receive and execute a command sent by the processor 1280. In addition, the touch-sensitive surface 1231 may be a resistive, capacitive, infrared, or surface sound wave type touch-sensitive surface. In addition to the touch-sensitive surface 1231, the input unit 1230 may further include the another input device 1232. For example, the another input device 1232 may include, but is not limited to: one or more of a physical keyboard, a functional key (such as a volume control key or a switch key), a track ball, a mouse, and a joystick.

The display unit 1240 may be configured to display information input by the user or information provided for the user, and various graphical user interfaces of the device 120. The graphical user interfaces may be composed of graphics, text, icons, videos, and any combination thereof. The display unit 1240 may include a display panel 1241. Optionally, the display panel 1241 may be configured by using a liquid crystal display (LCD), an organic light-emitting diode (OLED), or the like. Further, the touch-sensitive surface 1231 may cover the display panel 1241. After detecting a touch operation on or near the touch-sensitive surface 1231, the touch-sensitive surface 1231 transfers the touch operation to the processor 1280, so as to determine the type of a touch event. Then, the processor 1280 provides corresponding visual output on the display panel 1241 according to the type of the touch event. Although, in FIG. 12, the touch-sensitive surface 1231 and the display panel 1241 are used as two separate parts to implement input and output functions, in some examples, the touch-sensitive surface 1231 and the display panel 1241 may be integrated to implement the input and output functions.

The device 1200 may further include at least one sensor 1250 such as an optical sensor, a motion sensor, and other sensors. For example, the optical sensor may include an ambient light sensor and a proximity sensor. The ambient light sensor may adjust luminance of the display panel 1241 according to brightness of the ambient light. The proximity sensor may switch off the display panel 1241 and/or backlight when the device 1200 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the device 1200, are not described in detail herein.

The audio circuit 1260, a speaker 1221, and a microphone 1222 may provide audio interfaces between the user and the device 1200. The audio circuit 1260 may convert received audio data into an electric signal and transmit the electric signal to the speaker 1221. The speaker 1221 converts the electric signal into a sound signal for output. On the other hand, the microphone 1222 converts a collected sound signal into an electric signal. The audio circuit 1260 receives the electric signal and converts the electric signal into audio data, and outputs the audio data to the processor 1280 for processing. Then, the processor 1280 sends the audio data to another device by using the RF circuit 1210, or outputs the audio data to the memory 1220 for further processing. The audio circuit 1260 may further include an earplug jack, so as to provide communication between a peripheral earphone and the device 1200.

WiFi is a short distance wireless transmission technology. The device 1200 may help, by using the WiFi module 1270, the user to receive and send e-mails, browse a web page, access streaming media, and so on, which provides wireless broadband Internet access for the user. Although FIG. 12 shows the WiFi module 1270, it may be understood that the WiFi module 1270 is not a necessary component of the device 1200, and when required, the WiFi module 1270 may be omitted as long as the scope of the essence of the present disclosure is not changed.

The processor 1280 is the control center of the device 1200, and is connected to various parts of the entire device by using various interfaces and lines. By running or executing the software program and/or module stored in the memory 1220, and invoking data stored in the memory 1220, the processor 1280 performs various functions and data processing of the device 1200, thereby performing overall monitoring on the device. Optionally, the processor 1280 may include one or more processor cores. Optionally, the processor 1280 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1280.

The device 1200 further includes the power supply 1290 (such as a battery) for supplying power to the components. The power supply may be logically connected to the processor 1280 by using a power management system, thereby implementing functions such as charging, discharging, and power consumption management by using the power management system. The power supply 1290 may further include one or more of a direct current or alternating current power supply, a re-charging system, a power failure detection circuit, a power supply converter or inverter, a power supply state indicator, and any other component.

Although not shown in the figure, the device 1200 may further include a camera, a Bluetooth module, and the like, which are not described herein again.

The device 1200 further includes a memory, and one or more programs, where the one or more programs are stored in the memory, and are configured to be executed by one or more processors, so that the apparatus 1200 can perform the foregoing method that is for generating a targeted label and that is performed by the terminal.

Figure 13:
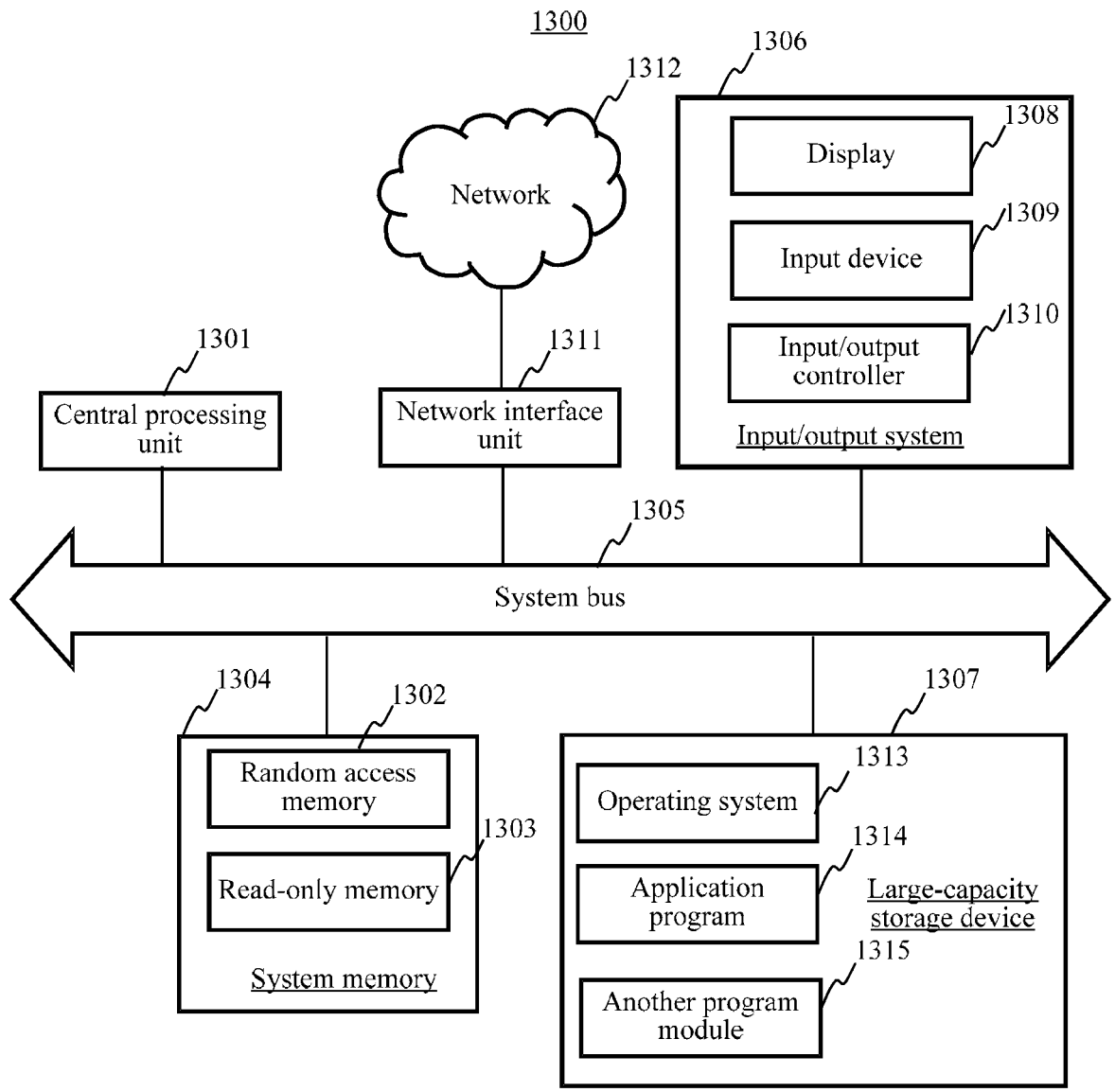
FIG. 13 is a structural block diagram of a server according to an example of this application.

Referring to FIG. 13, FIG. 13 is a structural block diagram of a server according to an example of this application. The server may be a server in a background server cluster 140. For example, the server 1300 includes a central processing unit (CPU) 1301, a system memory 1304 including a random access memory (RAM) 1302 and a read-only memory (ROM) 1303, and a system bus 1305 connected to the system memory 1304 and the CPU 1301. The server 1300 further includes a basic input/output system (I/O system) 1306 helping information transmission between various devices in a computer, and a large-capacity storage device 1307 configured to store an operating system 1313, an application program 1314, and another program module 1315.

The basic I/O system 1306 includes a display 1308 configured to display information and an input device 1309 configured to enter information by a user, for example, a mouse or a keyboard. The display 1308 and the input device 1309 are both connected to the CPU 1301 by using an input/output controller 1310 connected to the system bus 1305. The basic I/O system 1306 may further include the input/output controller 1310 for receiving and processing inputs from a plurality of other devices such as a keyboard, a mouse, or an electronic stylus. Similarly, the input and output controller 1310 further provides an output to a display screen, a printer or another type of output device.

The large-capacity storage device 1307 is connected to the CPU 1301 by using a large-capacity storage controller (not shown) connected to the system bus 1305. The large-capacity storage device 1307 and a computer readable medium associated with the large-capacity storage device 1307 provide non-volatile storage for the server 1300. That is, the large-capacity storage device 1307 may include a computer readable medium (not shown) such as a hard disk or a CD-ROM drive.

Without loss of generality, the computer readable medium may include a computer storage medium and a communication medium. The computer storage medium is a non-transitory computer-readable storage medium that includes volatile and non-volatile, movable and unmovable media implemented by using any method or technology and configured to store information such as a computer readable instruction, a data structure, a program module, or other data. The computer storage medium includes a RAM, a ROM, an EPROM, an EEPROM, a flash memory, or another solid-state storage technology, and a CD-ROM, a DVD, or another optical storage, and a cassette, a tape, magnetic storage, or another magnetic storage device. Certainly, a person skilled in the art may know that the computer storage medium is not limited to the foregoing. The system memory 1304 and the large-capacity storage device 1307 may be uniformly referred to as a memory.

According to the various examples of this application, the server 1300 may run by connecting to a remote computer on a network by using a network such as Internet. That is, the server 1300 may be connected to a network 1312 by using a network interface unit 1311 connected to the system bus 1305, or the server 1300 may be connected to a network of another type or a remote computer system (not shown) by using a network interface unit 1311.

The memory further includes one or more programs, where the one or more programs are stored in the memory, and include steps that are used for performing the method for generating a targeted label according to this example of this application and that are performed by a server cluster.

The sequence numbers of the foregoing examples of this application are merely for the convenience of description, and do not imply the preference among the examples.

A person of ordinary skill in the art may understand that all or some of the steps in the method for generating a targeted label of the foregoing example may be completed by hardware, or may be implemented by a program instructing relevant hardware. The program may be stored in a computer readable storage medium. The storage medium mentioned above may be a ROM, a magnetic disk, an optical disc, or the like.

The foregoing descriptions are merely examples of this application, and are not intended to limit this application. Any modification, equivalent replacement, improvement and the like made within the spirit and principle of this application should fall within the protection scope of this application.

What is claimed is:

1. A method of sending recommendation information, the method comprising:

obtaining, by processing circuitry of an apparatus in an information recommendation platform based on the recommendation information, an official account in a social network platform of a provider of the recommendation information, the social network platform being connected to the information recommendation platform via a network, the social network platform including a first set of servers, and the information recommendation platform including a second set of servers;

determining, by the processing circuitry, a first set of user accounts in the social network platform that follows the official account of the provider, each of the first set of user accounts having a corresponding user label stored in the social network platform and indicating a user attribute of a user associated with the respective user account;

calculating, by the processing circuitry, activity levels of the first set of user accounts, wherein an activity level of each user account is calculated based on a first frequency of sending, by the respective user account, a message to the official account, a second frequency of viewing, by the respective user account, messages released by the official account, and a third frequency of using, by the respective user account, services provided by the official account, the official account being a service provider to members of the social network platform;

obtaining a first filtered set of user accounts by filtering, by the processing circuitry, any of the first set of user accounts having the activity level that is less than a first threshold;

obtaining, by the processing circuitry, interaction infoimation of the first set of user accounts with the official account;

determining, by the processing circuitry based on interaction records of the first set of user accounts with the official account in the social network platform, sentiments of users associated with the first set of user accounts toward the official account according to the interaction information, each of the sentiments being of a positive sentiment type or a negative sentiment type, wherein the sentiments of the users toward the official account are identified at least based on graphical icons as the positive sentiment type or the negative sentiment type;

obtaining a second filtered set of user accounts by filtering, by the processing circuitry, any of the first set of user accounts associated with the users having the sentiments toward the official account of the negative sentiment type;

generating a second set of user accounts by including at least the first filtered set of user accounts or the second filtered set of user accounts;

creating, by the processing circuitry, a targeted label for the recommendation information according to user labels of the second set of user accounts, the targeted label indicating a scope of user attributes determined based on analyzing user attributes indicated by the user labels of the second set of user accounts;

identifying, by the processing circuitry from all user accounts in the social network platform, a third set of user accounts in the social network platform according to the scope of user attributes indicated by the created targeted label; and sending, via interface circuitry of the information recommendation platform, the recommendation information to user terminals associated with the third set of user accounts, the user terminals being connected to the social network platform over a wireless communication network or a wired communication network, wherein the targeted label created based on the generated second set of user accounts improves a coverage and an accuracy of the identified third set of user accounts, and thereby avoids wasting computing resources on sending the recommendation information.

2. The method according to claim 1, wherein the official account is registered by the provider of the recommendation information.

3. The method according to claim 1, wherein an information correlation degree between the official account and the recommendation information is greater than a second threshold.

4. The method according to claim 1, further comprising:
determining, by the processing circuitry, an extended user account associated with one of the second set of user accounts according to a degree of relationship between the one of the second set of user accounts and the extended user account in the social network platform; and
adding, by the processing circuitry, the extended user account to the third set of user accounts.

5. The method according to claim 1, further comprising:
obtaining, by the processing circuitry, user identifying information for the recommendation information, the user identifying information being used to determine at least one recommended user account;
determining, by the processing circuitry, the at least one recommended user account in the social network platform according to the user identifying information; and
adding, by the processing circuitry, the at least one recommended user account to the third set of user accounts.

6. The method according to claim 1, wherein the determining the targeted label comprises:
identifying, by the processing circuitry, one of the user labels of the second set of user accounts with a number of occurrences that is greater than a preset condition; and
determining, by the processing circuitry, the identified one of the user labels with the number of occurrences that is greater than the preset condition as the targeted label for the recommendation information.

7. The method according to claim 1, wherein the identifying the third set of user accounts comprises:
sending, via the interface circuitry, the targeted label to a client of the provider of the recommendation information;
receiving, via the interface circuitry, a provider selected targeted label that includes either an entire or a part of the targeted label; and
identifying the third set of user accounts in the social network platform according to the provider selected targeted label.

8. The method according to claim 1, wherein the user attributes indicated by the user labels of the second set of user accounts correspond to one or a combination of age, gender, education, hobby, and home location.

9. An apparatus in an info'ination recommendation platform, the apparatus comprising:
processing circuitry configured to:
obtain, based on the recommendation information, an official account in a social network platform of a provider of recommendation information, the social network platform being connected to the information recommendation platform via a network, the social network platform including a first set of servers, and the information recommendation platform including a second set of servers;
determine a first set of user accounts in the social network platform that follows the official account of the provider, each of the first set of user accounts having a corresponding user label stored in the social network platform and indicating a user attribute of a user associated with the respective user account;
calculate activity levels of the first set of user accounts, wherein an activity level of each user account is calculated based on a first frequency of sending, by the respective user account, a message to the official account, a second frequency of viewing, by the respective user account, messages released by the official account, and a third frequency of using, by the respective user account, services provided by the official account, the official account being a service provider to members of the social network platform;
obtain a first filtered set of user accounts by filtering any of the first set of user accounts having the activity level that is less than a first threshold;
obtain interaction information of the first set of user accounts with the official account;
determine, based on interaction records of the first set of user accounts with the official account in the social network platform, sentiments of users associated with the first set of user accounts toward the official account according to the interaction information, each of the sentiments being of a positive sentiment type or a negative sentiment type, wherein the sentiments of the users toward the official account are identified at least based on graphical icons as the positive sentiment type or the negative sentiment type;
obtain a second filtered set of user accounts by filtering any of the first set of user accounts associated with the users having the sentiments toward the official account of the negative sentiment type,
generate a second set of user accounts by including at least the first filtered set of user accounts or the second filtered set of user accounts;
determine create a targeted label for the recommendation information according to user labels of the second set of user accounts, the targeted label indicating a scope of user attributes determined based on analyzing user attributes indicated by the user labels of the second set of user accounts;
identify, from all user accounts in the social network platform, a third set of user accounts in the social network platform according to the scope of user attributes indicated by the determined created targeted label; and
send, via interface circuitry of the information recommendation platform, the recommendation information to user terminals associated with the third set of user accounts, the user terminals being connected to the social network platform over a wireless communication network or a wired communication network,
wherein the targeted label created based on the generated second set of user accounts improves a coverage and an accuracy of the identified third set of user accounts, and thereby avoids wasting computing resources on sending the recommendation information.

10. The apparatus according to claim 9, wherein the official account is registered by the provider of the recommendation information.

11. The apparatus according to claim 9, wherein an information correlation degree between the official account and the recommendation information is greater than a second threshold.

12. The apparatus according to claim 9, wherein the processing circuitry is configured to:
determine an extended user account associated with one of the second set of user accounts according to a degree of relationship between the one of the second set of user accounts and the extended user account in the social network platform;and add the extended user account to the third set of user accounts.

13. The apparatus according to claim 9, wherein the processing circuitry is configured to:

obtain user identifying information for the recommendation information, the user identifying information being used to determine at least one recommended user account;

determine the at least one recommended user account in the social network platform according to the user identifying information;and add the at least one recommended user account to the third set of user accounts.

14. The apparatus according to claim 9, wherein the processing circuitry is configured to:

identify one of the user labels of the second set of user accounts with a number of occurrences that is greater than a preset condition; and determine the identified one of the user labels with the number of occunences that is greater than the preset condition as the targeted label for the recommendation information.

15. The apparatus according to claim 9, wherein the processing circuitry is configured to:

send, via the interface circuitry, the targeted label to a client of the provider of the recommendation information;

receive, via the interface circuitry, a provider selected targeted label that includes either an entire or a part of the targeted label; and identify the third set of user accounts in the social network platform according to the provider selected targeted label.

16. A non-transitory computer readable storage medium, storing computer readable instructions, which when executed by at least one processor in an information recommendation platform cause the at least one processor to perform:

obtaining, based on the recommendation information, an official account in a social network platform of a provider of recommendation information, the social network platform being connected to the information recommendation platform via a network, the social network platform including a first set of servers, and the information recommendation platform including a second set of servers;

determining a first set of user accounts in the social network platform that follows the official account of the provider, each of the first set of user accounts having a corresponding user label stored in the social network platform and indicating a user attribute of a user associated with the respective user account;

calculating, activity levels of the first set of user accounts, wherein an activity level of each user account is calculated based on a first frequency of sending, by the respective user account, a message to the official account, a second frequency of viewing, by the respective user account, messages released by the official account, and a third frequency of using, by the respective user account, services provided by the official account, the official account being a service provider to members of the social network platform;

obtaining a first filtered set of user accounts by filtering any of the first set of user accounts having the activity level that is less than a threshold;

obtaining interaction information of the first set of user accounts with the official account;

determining, based on interaction records of the first set of user accounts with the official account in the social network platform, sentiments of users associated with the first set of user accounts toward the official account according to the interaction information, each of the sentiments being of a positive sentiment type or a negative sentiment type, wherein the sentiments of the users toward the official account are identified at least based on graphical icons as the positive sentiment type or the negative sentiment type;

obtaining a second filtered set of user accounts by filtering any of the first set of user accounts associated with the users having the sentiments toward the official account of the negative sentiment type;

generating a second set of user accounts by including at least the first filtered set of user accounts or the second filtered set of user accounts;

creating a targeted label for the recommendation information according to user labels of the second set of user accounts, the targeted label indicating a scope of user attributes determined based on analyzing user attributes indicated by the user labels of the second set of user accounts;

identifying, from all user accounts in the social network platform, a third set of user accounts in the social network platform according to the scope of user attributes indicated by the created targeted label; and sending, via interface circuitry of the information recommendation platfoiin, the recommendation information to user terminals associated with the third set of user accounts, the user terminals being connected to the social network platform over a wireless communication network or a wired communication network, wherein the targeted label created based on the generated second set of user accounts improves a coverage and an accuracy of the identified third set of user accounts, and thereby avoids wasting computing resources on sending the recommendation information.

17. The non-transitory computer readable storage medium according to claim 16, wherein the identifying the third set of user accounts comprises:

sending, via the interface circuitry, the targeted label to a client of the provider of the recommendation information;

receiving, via the interface circuitry, a provider selected targeted label that includes either an entire or a part of the targeted label; and identifying the third set of user accounts in the social network platform according to the provider selected targeted label.

* * * * *